(12) United States Patent
Esser et al.

(10) Patent No.: US 9,733,491 B2
(45) Date of Patent: Aug. 15, 2017

(54) METHOD FOR CALCULATING AND OPTIMIZING AN EYEGLASS LENS TAKING INTO CONSIDERATION HIGHER-ORDER IMAGING ERRORS

(75) Inventors: Gregor Esser, Munich (DE); Helmut Altheimer, Baisweil-Lauchdorf (DE); Wolfgang Becken, Munich (DE); Dietmar Uttenweiler, Icking (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 14/118,455

(22) PCT Filed: Mar. 29, 2012

(86) PCT No.: PCT/EP2012/001443
§ 371 (c)(1),
(2), (4) Date: Dec. 19, 2013

(87) PCT Pub. No.: WO2012/156007
PCT Pub. Date: Nov. 22, 2012

(65) Prior Publication Data
US 2014/0098341 A1    Apr. 10, 2014

(30) Foreign Application Priority Data
May 18, 2011   (DE) .................. 10 2011 101 923

(51) Int. Cl.
*G02C 7/02* (2006.01)
*G02C 7/06* (2006.01)

(52) U.S. Cl.
CPC ............... *G02C 7/028* (2013.01); *G02C 7/02* (2013.01); *G02C 7/027* (2013.01); *G02C 7/063* (2013.01); *G02C 2202/22* (2013.01)

(58) Field of Classification Search
CPC .......................................... G02C 7/024–7/028

(Continued)

(56) References Cited

U.S. PATENT DOCUMENTS

2010/0141893 A1\* 6/2010 Altheimer et al. ........... 351/175

FOREIGN PATENT DOCUMENTS

DE      10 313 275       10/2004
DE       10313275 A1     10/2004
(Continued)

OTHER PUBLICATIONS

G. Esser, W. Becken, W. Müller, P. Baumbach, J. Arasa, and D. Uttenweiler, "Derivation of the propagation equations for higher order aberrations of local wavefronts," J. Opt. Soc. Am. A vol. 28, 2442-2458 (Dec. 2011).\*
Esser G, et al., "Derivation of the refraction equations for higher-order aberrations of local wavefronts at oblique incidence", Journal of the Optical Society of America, Feb. 1, 2010, vol. 27, No. 2, pp. 218-237.

(Continued)

*Primary Examiner* — Zachary Wilkes
(74) *Attorney, Agent, or Firm* — Schiff Hardin LLP

(57) ABSTRACT

Method for calculating or optimizing a spectacle lens, including
  specifying at least one surface for the spectacle lens to be calculated or optimized;
  determining the course of a main ray through at least one visual point of the at least one surface;
  determining a first primary set and a second primary set of coefficients of the local aberration of a local wavefront;
  specifying at least one function which assigns a second secondary set of coefficients to a second primary set of coefficients, said second secondary set of coefficients defining the higher-order aberration of a propagated wavefront;
  determining a higher-order aberration of a local wavefront propagated starting from the at least one visual point along the main ray depending on at least the second primary set of coefficients on the basis of the specified function; and (Continued)

Figure 1:
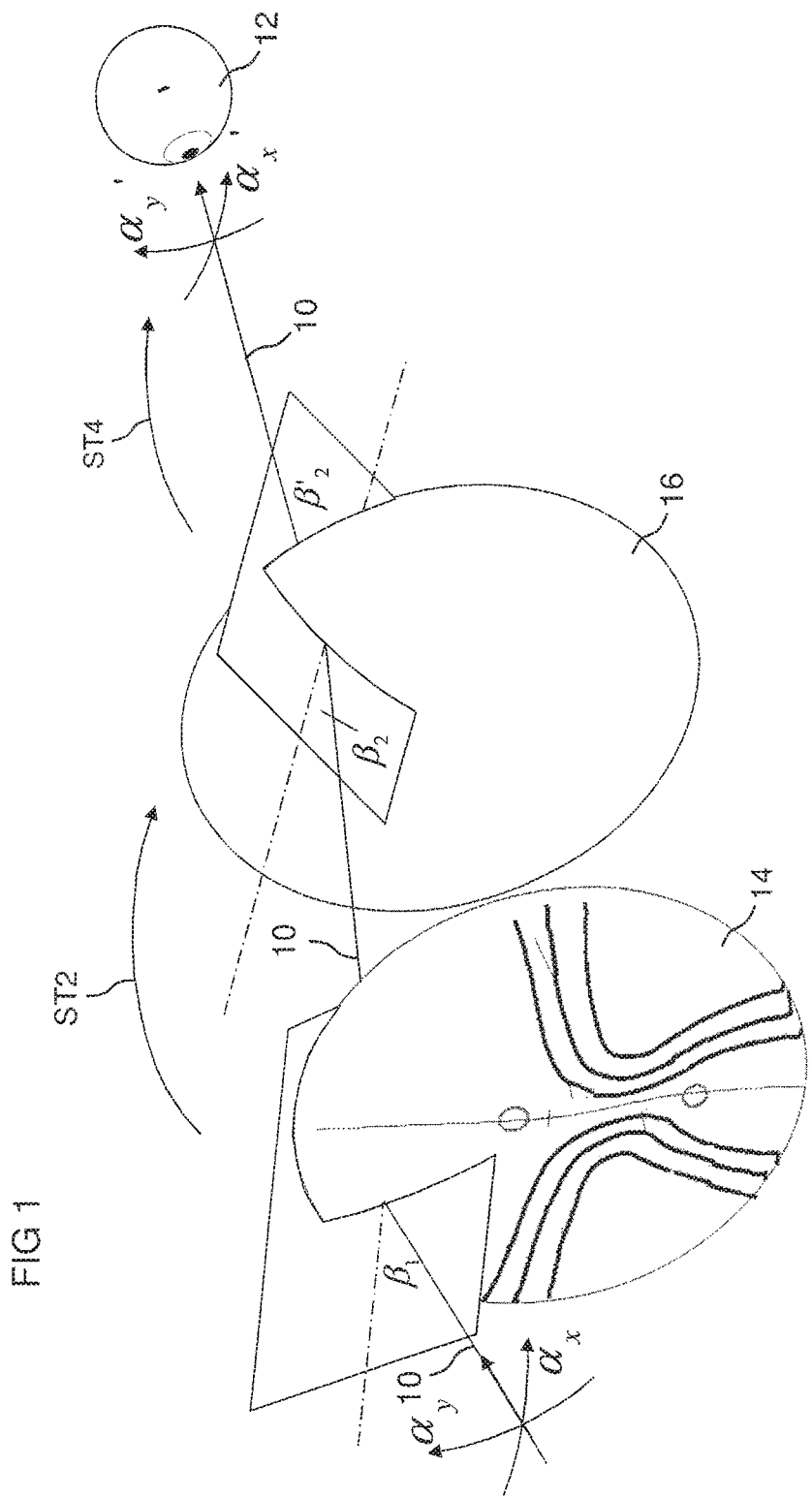

calculating or optimizing the at least one surface of the spectacle lens based on the determined higher-order aberration of the propagated local wavefront.

12 Claims, 5 Drawing Sheets

(58) Field of Classification Search
USPC .................................................. 351/159.76
See application file for complete search history.

(56) References Cited

FOREIGN PATENT DOCUMENTS

| WO | WO 2008/089999 | 7/2008 |
|----|----------------|--------|
| WO | WO-2008/089999 A1 | 7/2008 |

OTHER PUBLICATIONS

PCT/EP2014/001443 International Search Report dated Jun. 27, 2012.
International Search Report issued for PCT/EP2012/001443, date of mailing: Jun. 18, 2012.
Esser, et al., "Derivation of the Refraction Equations for Higher-Order Aberrations of Local Wavefronts At Oblique Incidence", Journal of the Optical Society of America, vol. 27, No. 2, pp. 218-237 (Feb. 1, 2010).

* cited by examiner

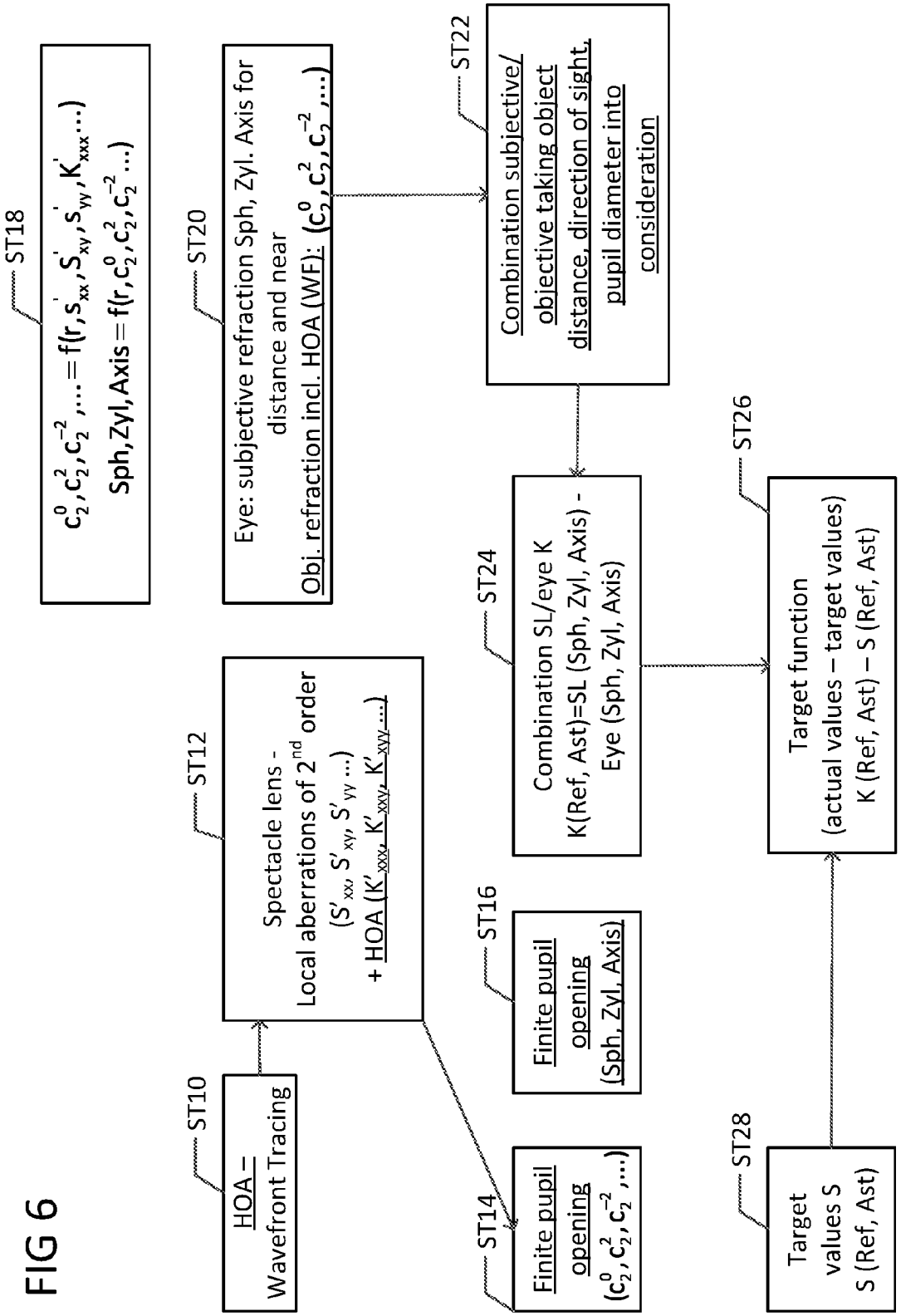

METHOD FOR CALCULATING AND OPTIMIZING AN EYEGLASS LENS TAKING INTO CONSIDERATION HIGHER-ORDER IMAGING ERRORS

BACKGROUND

The present invention relates to a method, a device, and a corresponding computer program product for calculating (optimizing) and producing a spectacle lens taking into consideration higher-order aberrations of both the eye and the spectacle lens.

For the production or optimization of spectacle lenses, in particular of individual spectacle lenses, each spectacle lens is manufactured such that the best possible correction of a refractive error of the respective eye of the spectacles wearer is obtained for each desired direction of sight or each desired object point. In general, a spectacle lens is said to be fully corrective for a given direction of sight if the values sphere, cylinder, and axis of the wavefront upon passing the vertex sphere match with the values for sphere, cylinder, and axis of the prescription for the eye having the visual defect. In the refraction determination for an eye of a spectacles wearer, dioptric values (particularly sphere, cylinder, cylinder axis) for a far (usually infinite) distance and optionally (for multifocal or progressive lenses) an addition for a near distance (e.g. according to DIN 58208) are determined. In this way, the prescription (in particular sphere, cylinder, cylinder axis, and optionally addition) that is sent to a spectacles manufacturer is stipulated. In modern spectacle lenses, object distances deviating from the standard, which are used in the refraction determination, can be indicated additionally.

However, a full correction for all directions of sight at the same time is normally not possible. Therefore, the spectacle lenses are manufactured such that they achieve a good correction of visual defects of the eye and only small aberrations in the main regions of use, especially in central visual regions, while larger aberrations are permitted in peripheral regions.

In order to be able to manufacture a spectacle lens in this way, the spectacle lens surfaces or at least one of the spectacle lens surfaces is first of all calculated such that the desired distribution of the unavoidable aberrations is effected thereby. This calculation and optimization is usually performed by means of an iterative variation method by minimization of a target function. As a target function, particularly a function F having the following functional connection with the spherical power S, the magnitude of the cylindrical power Z, and the axis of the cylinder a (also referred to as "SZA" combination) is taken into account and minimized:

$$F = \sum_{i=1}^{m} [g_{i,S\Delta}(S_{\Delta,i} - S_{\Delta,i,target})^2 + g_{i,Z\Delta}(Z_{\Delta,i} - Z_{\Delta,i,target})^2 + \ldots ].$$

In the target function F, at the evaluation points i of the spectacle lens, at least the actual refractive deficits of the spherical power $S_{\Delta,i}$ and the cylindrical power $Z_{\Delta,i}$ as well as target values for the refractive deficits of the spherical power $S_{\Delta,i,target}$ and the cylindrical power $Z_{\Delta,i,target}$ are taken into consideration.

It was found in DE 103 13 275 that it is advantageous to not indicate the target values as absolute values of the properties to be optimized, but as their deviation from the prescription, i.e. as the required misadjustment. This has the advantage that the target values are independent of the prescription ($Sph_V, Zyl_V, Axis_V, Pr_V, B_V$) and that the target values do not have to be changed for every individual prescription. Thus, as "actual" values of the properties to be optimized, not absolute values of these optical properties are taken into account in the target function, but the deviations from the prescription. This has the advantage that the target values can be specified independent of the prescription and do not have to be changed for every individual prescription.

The respective refractive deficits at the respective evaluation points are preferably taken into consideration with weighting factors $g_{i,S\Delta}$ and $g_{i,Z\Delta}$. Here, the target values for the refractive deficit of the spherical power $S_{\Delta,i,target}$ and/or the cylindrical power $Z_{\Delta,i,target}$, particularly together with the weighting factor $g_{i,S\Delta}$ and $g_{i,Z\Delta}$, form the so-called spectacle lens design. In addition, particularly further residues, especially further parameters to be optimized, such as coma and/or spherical aberration and/or prism and/or magnification and/or anamorphic distortion, etc., can be taken into consideration, which is particularly implied by the expression "+ . . . ".

In some cases, this can contribute to a clear improvement particularly of an individual adjustment of a spectacle lens if in the optimization of the spectacle lens not only aberrations up to the second order (sphere, magnitude of astigmatism, and cylinder axis), but also higher-order aberrations (e.g. coma, trefoil, spherical aberration) are taken into consideration.

It is known from the prior art to determine the shape of a wavefront for optical elements and particularly spectacle lenses that are delimited by at least two refractive boundary surfaces. For example, this can be done by means of a numerical calculation of a sufficient number of neighboring rays, along with a subsequent fit of the wavefront data by Zernike polynomials. Another approach is based on local wavefront tracing in the refraction (cf. WO 2008/089999 A1). Here, only one single ray (the main ray) per visual point is calculated, accompanied by the derivatives of the vertex depth of the wavefront according to the transversal coordinates (perpendicular to the main ray). These derivatives can be formed up to a specific order, wherein the second derivatives describe the local curvature properties of the wavefront (such as refractive power, astigmatism) and the higher derivatives are connected with the higher-order aberrations.

In the tracing of light through a spectacle lens, the local derivatives of the wavefront are calculated at a suitable position in the course of the ray in order to compare them with desired values obtained from the refraction of the spectacle lens wearer. This position can be the vertex sphere, for example. In this respect, it is assumed that a spherical wavefront starts at the object point and propagates up to the first spectacle lens surface. There, the wavefront is refracted and subsequently propagates to the second spectacle lens surface, where it is refracted again. If further surfaces exist, the alternation of propagation and refraction will be continued until the last boundary surface has been passed. The last propagation takes place from this last boundary surface to the vertex sphere.

WO 2008/089999 A1 discloses the laws of refraction at refractive surfaces not only for aberrations or optical properties of second order, but also for higher orders. If a wavefront with local derivatives known up to a specific order is obliquely incident on a boundary surface, the vertex depth of which can itself be described by known local derivatives up to the same order, then the local derivatives of the outgoing wavefront can be calculated up to the same order with the calculation methods according to WO 2008/089999 A1. Such a calculation, particularly up to the second order, is very helpful for assessing the image formation properties or optical properties of a spectacle lens in the wearing position. Specifically, such a calculation is of great importance if a spectacle lens is to be optimized in the wearing position over all visual points.

Even if the process of refraction can be described and calculated very efficiently therewith, the consideration of higher-order aberrations remains very expensive nevertheless, since especially the required iterative ray tracing for the propagation of the wavefronts involves great computing effort.

SUMMARY

It is the object of the invention to provide an improved method for calculating or optimizing a spectacle lens, preferably a progressive spectacle lens, wherein the spectacle lens is adapted to the individual needs of the spectacles wearer in an improved way. This object is solved by a computer-implemented method, a device, a computer program product, and a storage medium with the features indicated in the independent claims. Preferred embodiments are subject of the dependent claims.

According to a first aspect, the invention provides a computer-implemented method for calculating or optimizing a spectacle lens. First of all, the method comprises specifying at least one surface for the spectacle lens to be calculated or optimized. This surface particularly serves as a starting surface for the further individual optimization. Preferably, the surface is the back surface of the spectacle lens. Preferably, a corresponding starting surface is specified both for the front surface and for the back surface of the spectacle lens. In a preferred embodiment, only one surface is iteratively varied or optimized during the optimization process. The other surface of the spectacle lens may be a simple spherical or rotationally symmetric aspherical surface. However, it is also possible to optimize both surfaces.

Starting from the at least one specified surface, the method comprises determining the course of a main ray through at least one visual point (i) of the at least one surface. Particularly preferably, the course of the main ray is determined starting from an object point through the spectacle lens up to a reference surface or assessment surface or comparative surface, in particular the vertex sphere.

At the at least one visual point (i), a first primary set ($s_{io}$) and a second primary set ($e_{iok}$) of coefficients of the local aberration of a local wavefront going out from the at least one visual point (i) are determined in a vicinity of the main ray, wherein the first primary set of coefficients ($s_{io}$) specifies the spherical and astigmatic aberration of the outgoing local wavefront and the second primary set of coefficients ($e_{iok}$) specifies at least one further higher-order aberration (k>2) of the outgoing local wavefront. The outgoing wavefront (or later also referred to as the original wavefront) is the result of the refraction of light on the at least one surface. If the one surface is the front surface, the outgoing wavefront preferably reflects the local refraction properties of the surface in addition to the object distance (and the thus involved vergence of the wavefront before hitting said surface). The process of refraction could be determined particularly by analogy with the description in WO 2008/089999 A1 or in J. Opt. Soc. Am. A 27, 218-237.

Now, the invention suggests specifying a function $e_{pk}=f(e_{ok})$ which assigns a second secondary set of coefficients ($e_{pk}$) to a second primary set of coefficients ($e_{ok}$), said second secondary set of coefficients specifying the at least one higher-order aberration of a propagated wavefront. Specifically, by means of this function, it is very easily possible to determine the propagation of a wavefront on the basis of coefficients of the original wavefront.

Thus, the method according to the invention comprises determining at least one higher-order aberration of a local wavefront propagated starting from the at least one visual point (i) along the main ray depending on at least the second primary set of coefficients ($e_{iok}$) on the basis of the specified function $e_{pk}=f(e_{ok})$. Specifically, to this end, a first and a second secondary set of coefficients of the propagated wavefront are determined. While the spherical and astigmatic curvature of the wavefront, i.e. the first secondary set of coefficients, are determined particularly on the basis of the first primary set of coefficients basically in a known manner, the invention suggests a very efficient method for determining the second secondary set of coefficients as well without being dependent on complex ray tracing like in conventional methods.

For the benefit of a clear representation of aspects of the invention, the following terminology for the designation of the coefficients will be used within the scope of this description. Here, the coefficients or sets of coefficients used or determined for describing the outgoing (original) local wavefront will be referred to as "primary" coefficients or "primary" sets of coefficients. Accordingly, the coefficients or sets of coefficients used or determined for describing the propagated local wavefront will be referred to as "secondary" coefficients or "secondary" sets of coefficients. Moreover, the coefficients or sets of coefficients used or determined for describing the spherical and astigmatic aberration of the respective local wavefront will be referred to as "first" coefficients or "first" sets of coefficients, while the coefficients or sets of coefficients used or determined for describing the aberrations, i.e. higher-order aberrations, deviating from the spherical and astigmatic aberrations will be referred to as "second" coefficients or "second" sets of coefficients.

After the refraction-induced influence of the spectacle lens on the wavefront was very efficiently determined for higher-order aberrations (as described in e.g. WO 2008/089999 A1 or J. Opt. Soc. Am. A 27, 218-237), the method according to the invention now comprises calculating or optimizing the at least one surface of the spectacle lens taking into consideration the determined aberration or higher-order aberrations of the propagated local wavefront. Preferably, a comparison of the influence on the wavefront, caused by the spectacle lens to be optimized, with the required prescription is performed at the vertex sphere taking higher-order aberrations into consideration. Depending on the deviation, at least one of the surfaces of the spectacle lens is varied and the process is repeated correspondingly until the spectacle lens comes sufficiently close to the required power.

In this way, the invention allows a very fast and precise consideration of higher-order aberrations with clearly reduced computing effort. Thus, an improvement of the individual adjustment of a spectacle lens can be achieved without substantially increasing the computing effort.

Preferably, specifying at least one function $e_{pk}=f(e_{ok})$ comprises specifying a linear function $e_{pk}=B_k(e_{ok}+r_k)$, or the function $e_{pk}=f(e_{ok})$ is specified as a linear function $e_{pk}=B_k(e_{ok}+r_k)$ in which the proportionality term $B_k$ depends on the first primary set of coefficients ($s_{io}$), but not on the second primary set of coefficients ($e_{ok}$). Preferably, the remainder term $r_k$ does also not depend on the second primary set of coefficients ($e_{ok}$). Particularly preferably, it holds that $r_k=0$, i.e. $e_{pk}=B_k e_{ok}$. These embodiments result in a very efficient optimization particularly for the consideration of third-order aberrations (k=3).

For a particularly efficient consideration of third-order aberrations (e.g. coma), it is preferred that determining a first primary set of coefficients comprise determining a power vector $$s_o = \begin{pmatrix} S_{oxx} \\ S_{oxy} \\ S_{oyy} \end{pmatrix},$$

wherein determining a second primary set of coefficients comprises determining a coma vector $$e_{o3} = \begin{pmatrix} E_{oxxx} \\ E_{oxxy} \\ E_{oxyy} \\ E_{oyyy} \end{pmatrix},$$

and wherein the function $$e_{p3} = B_3 e_{o3} = \gamma^3 \begin{pmatrix} \beta_y^{-3} & 3\beta_y^{-2}\frac{d}{n}S_{xy} & 3\beta_y^{-1}\left(\frac{d}{n}S_{xy}\right)^2 & \left(\frac{d}{n}S_{xy}\right)^3 \\ \beta_y^{-2}\frac{d}{n}S_{xy} & \beta_y^{-1}\left(\frac{1}{\gamma}+3\left(\frac{d}{n}S_{xy}\right)^2\right) & \frac{2}{\gamma}\frac{d}{n}S_{xy}+3\left(\frac{d}{n}S_{xy}\right)^3 & \beta_x^{-1}\left(\frac{d}{n}S_{xy}\right)^2 \\ \beta_y^{-1}\left(\frac{d}{n}S_{xy}\right)^2 & \frac{2}{\gamma}\frac{d}{n}S_{xy}+3\left(\frac{d}{n}S_{xy}\right)^3 & \beta_x^{-1}\left(\frac{1}{\gamma}+3\left(\frac{d}{n}S_{xy}\right)^2\right) & \beta_x^{-2}\frac{d}{n}S_{xy} \\ \left(\frac{d}{n}S_{xy}\right)^3 & 3\beta_x^{-1}\left(\frac{d}{n}S_{xy}\right)^2 & 3\beta_x^{-2}\frac{d}{n}S_{xy} & \beta_y^{-3} \end{pmatrix} e_{o3}$$

with $\gamma = \dfrac{1}{1-\frac{d}{n}S_{oxx}-\left(\frac{d}{n}S_{oxy}\right)^2-\frac{d}{n}S_{oyy}+\left(\frac{d}{n}\right)^2 S_{oxx}S_{oyy}}$, $\beta_x = \dfrac{1}{1-\frac{d}{n}S_{oxx}}$ and $\beta_y = \dfrac{1}{1-\frac{d}{n}S_{oyy}}$ is specified as at least one function $e_{p3}=f(e_{o3})$.

In a preferred embodiment, determining the second primary set of coefficients ($e_{iok}$) comprises determining at least a plurality of primary subsets ($e_{iok}$, for k=3, 4, . . . ) of the second primary set of coefficients ($e_{iok}$). Here, specifying at least one function $e_{pk}=f(e_{ok})$ preferably comprises specifying a linear function $e_{pk}=B_k(e_{ok}+r_k)$ for each subset (i.e. for each k=3, 4, . . . ) such that for each of the linear functions (i.e. for each k=3, 4, . . . ) the proportionality term $B_k$ depends on the first primary set of coefficients ($s_{io}$), but not on the second primary set of coefficients ($e_{ok}$). Preferably, the remainder term $r_{k_0}$ of a linear function for the subset of the order $k_0$ does also not depend on the coefficients of the respective subset $k_0$, but at most on coefficients of the preceding subset or the preceding subsets (i.e. the coefficients of the order k<$k_0$). To this end, the subsets ($e_{iok}$, for k=3, 4, . . . ) of the second primary set of coefficients ($e_{iok}$) are preferably determined such that they form a series of consecutive subsets in a specific or specifiable sequence of ascending orders. In particular, each subset represents aberrations of the corresponding order, which corresponds e.g. to the order (k=3, 4, . . . ) of associated Zernike polynomials of the respective aberrations.

In a particularly preferred embodiment, determining the second primary set of coefficients ($e_{iok}$) comprises determining at least one first primary subset ($e_{io3}$) and one second primary subset ($e_{io4}$) of the second primary set of coefficients ($e_{iok}$). Here, specifying at least one function $e_{pk}=f(e_{ok})$ preferably comprises specifying a first linear function $e_{p3}=B_3(e_{o3}+r_3)$ in which the proportionality term $B_3$ depends on the first primary set of coefficients ($s_{io}$), but not on the second primary set of coefficients ($e_{ok}$). Preferably, the remainder term $r_3$ does also not depend on the second primary set of coefficients ($e_{ok}$). Particularly preferably, it even holds that $r_3=0$, i.e. $e_{p3}=B_3 e_{o3}$. In addition, specifying at least one function $e_{pk}=f(e_{ok})$ in this embodiment preferably comprises specifying a second linear function $e_{p4}=B_4(e_{o4}+r_4)$ in which the proportionality term $B_4$ depends on the first primary set of coefficients ($s_{io}$), but not on the second primary set of coefficients ($e_{ok}$). Preferably, the remainder term $r_4$ does not depend on the second primary subset ($e_{io4}$) of the second primary set of coefficients ($e_{ok}$). This results in a very efficient optimization particularly for the consideration of fourth-order aberrations (k=4). Particularly preferably, the remainder term $r_4$ of the second linear function depends on the first primary subset ($e_{io3}$) of the second primary set of coefficients ($e_{ok}$).

For a particularly efficient consideration of fourth-order aberrations (e.g. spherical aberration), it is preferred that determining a first primary set of coefficients comprise determining a power vector $$s_o = \begin{pmatrix} S_{oxx} \\ S_{oxy} \\ S_{oyy} \end{pmatrix},$$

wherein determining a second primary set of coefficients comprises determining a coma vector $$e_{o3} = \begin{pmatrix} E_{oxxx} \\ E_{oxxy} \\ E_{oxyy} \\ E_{oyyy} \end{pmatrix}$$

and determining a spherical aberration vector $$e_{o4} = \begin{pmatrix} E_{oxxxx} \\ E_{oxxxy} \\ E_{oxxyy} \\ E_{oxyyy} \\ E_{oyyyy} \end{pmatrix},$$

and
wherein the function $$e_{p4} = \begin{pmatrix} \beta_x^4 & \cdots & & \cdots & 0 \\ \vdots & \beta_x^3 \beta_y^1 & & & \vdots \\ & & \beta_x^2 \beta_y^2 & & \\ \vdots & & & \beta_x^1 \beta_y^3 & \vdots \\ 0 & \cdots & & \cdots & \beta_y^4 \end{pmatrix} e_{o4} + \frac{d}{n}$$

$$\begin{pmatrix} 3\left(\beta_x E_{oxxx}^2 + \beta_y E_{oxxy}^2 - \frac{S_{oxx}^4}{n^2}\right) \\ 3E_{oxxy}(\beta_x E_{oxxx} + \beta_y E_{oxyy}) \\ \beta_x(2E_{oxxy}^2 + E_{oxxx} E_{oxyy}) + \beta_y(2E_{oxyy}^2 + E_{oxxy} E_{oyyy}) - \left(\frac{S_{oxx} S_{oyy}}{n}\right)^2 \\ 3E_{oxyy}(\beta_x E_{oxxy} + \beta_y E_{oyyy}) \\ 3\left(\beta_x E_{oxyy}^2 + \beta_y E_{oyyy}^2 - \frac{S_{oyy}^4}{n^2}\right) \end{pmatrix}$$

with $\beta_x = \dfrac{1}{1 - \dfrac{d}{n} S_{oxx}}$ and $\beta_y = \dfrac{1}{1 - \dfrac{d}{n} S_{oyy}}$ is specified as at least one function $e_{pk} = f(e_{ok})$. Here, the coefficients of the coma vector particularly form the first primary subset, and the coefficients of the spherical aberration vector particularly form the second primary subset of the second primary set of coefficients.

Preferably, the method further comprises determining an angle $\alpha$ between a first plane of refraction of the main ray at a first surface of the spectacle lens and a second plane of refraction of the main ray at a second surface of the spectacle lens, wherein determining a higher-order aberration comprises determining a second secondary set ($e_{ipk}$) of coefficients of the local aberration of the propagated wavefront; and
    determining a transformed second secondary set ($\tilde{e}_{ipk}$) of coefficients depending on the determined angle $\alpha$, particularly by applying a rotation matrix $R_k(\alpha)$. Thus, for each refraction step, a Cartesian coordinate system can preferably be selected such that an axis of a Cartesian coordinate system is perpendicular to the plane of refraction and remains unchanged upon transition through the refractive surface, which results in an easy calculation of the refraction process.

Preferably, the method further comprises collecting prescription or refraction data V, wherein the prescription data comprises data with respect to the spherical power $Sph_V$, the magnitude of the astigmatism $Zyl_V$, the astigmatism axis $Axis_V$, as well as at least one further predetermined higher-order refraction $HOA_V$.

Preferably, the method comprises minimizing a target function in which values of higher-order aberrations are explicitly taken into consideration, e.g. in the form of $$\min F = \sum_i G_{R,i}(R_{actual}(i) - R_{target}(i))^2 + G_{A,i}(A_{actual}(i) - A_{target}(i))^2 + G_{C,i}(C_{actual}(i) - C_{target}(i))^2 + G_{S,i}(S_{actual}(i) - S_{target}(i))^2 + \ldots$$

$R_{actual}(i)$ actual refractive error (difference spectacle lens and eye) at the $i^{th}$ evaluation point
$R_{target}(i)$ required refractive error at the $i^{th}$ evaluation point
$G_{R,i}$ weighting of the refractive error at the $i^{th}$ evaluation point
$A_{actual}(i)$ actual astigmatic difference (difference spectacle lens and eye) at the $i^{th}$ evaluation point
$A_{target}(i)$ required astigmatic difference at the $i^{th}$ evaluation point
$G_{A,i}$ weighting of the astigmatic difference at the $i^{th}$ evaluation point
and additionally
$C_{actual}(i)$ actual difference of the coma of the spectacle lens and the eye at the $i^{th}$ evaluation point
$C_{target}(i)$ required difference of the coma at the $i^{th}$ evaluation point
$G_{C,i}$ weighting of the coma at the $i^{th}$ evaluation point
$S_{actual}(i)$ actual difference of the spherical aberration of the spectacle lens and the eye at the $i^{th}$ evaluation point
$S_{target}(i)$ required difference of the spherical aberration at the $i^{th}$ evaluation point
$G_{S,i}$ weighting of the spherical aberration at the $i^{th}$ evaluation point.

If the target function is extended, the degree of overdetermination will increase, whereby the stability of the optimization method can deteriorate. Therefore, it is preferred that the target function is not extended, i.e. that the higher-order aberrations are not explicitly taken into account in the target function, but that both the higher-order aberrations of the eye and of the spectacle lens are taken into account in the respective spherocylindrical values. In this case, the method preferably comprises minimizing a target function in which values of higher-order aberrations are implicitly taken into consideration over transformed values of the refractive error and the astigmatism difference, e.g. in the form of $$\min F = \sum_i G_{R,i}(R_{actual,t}(i) - R_{target}(i))^2 + G_{A,i}(A_{actual,t}(i) - A_{target}(i))^2$$

$R_{actual,t}(i)$ transformed refractive error (difference spectacle lens and eye) at the $i^{th}$ evaluation point
$R_{target}(i)$ required refractive error at the $i^{th}$ evaluation point
$G_{R,i}$ weighting of the refractive error at the $i^{th}$ evaluation point
$A_{actual,t}(i)$ transformed astigmatic difference (difference spectacle lens and eye) at the $i^{th}$ evaluation point
$A_{target}(i)$ required astigmatic difference at the $i^{th}$ evaluation point
$G_{A,i}$ weighting of the astigmatic difference at the $i^{th}$ evaluation point.

In a preferred embodiment, the method comprises determining a transformed first secondary set of coefficients from the first secondary set of coefficients and the second secondary set of coefficients. Specifically, a transformed first secondary coefficient is determined for every first secondary coefficient of the set of first secondary coefficients in dependence on at least one coefficient of the second secondary set of coefficients, i.e. in dependence on at least one higher-order aberration. The transformed first secondary coefficients then specifically define the transformed spherocylindrical refraction.

For specifying the way in which the transformed spherocylindrical refraction (in minus cylinder notation) depends on the higher-order aberrations in preferred embodiments, preferably the following function are provided:

$$sph(u, v, w; r_0) = \frac{4\sqrt{3}}{r_0^2}\left(u + \frac{\sqrt{2}\sqrt{v^2+w^2}}{2}\right)$$

$$zyl(v, w; r_0) = -\frac{4\sqrt{3}}{r_0^2}\sqrt{2}\sqrt{v^2+w^2}$$

$$a(v, w; r_0) = \frac{1}{2}\arctan(w, v)$$

with $$\arctan(x, y) := \begin{cases} \arctan(y/x), & x > 0 \\ \arctan(y/x) + \pi, & x < 0, y > 0 \\ \pi, & x < 0, y = 0 \\ \arctan(y/x) - \pi, & x < 0, y < 0 \end{cases}$$

In an embodiment in which the higher-order aberrations are at least not explicitly used for the transformation of the spherocylindrical values, a transformed refraction is preferably determined by:

$$Sph(c_2^0, c_2^{-2}, c_2^2, \{c_n^m\}; r_0) = sph(c_2^0, c_2^{-2}, c_2^2; r_0)$$

$$Zyl(c_2^0, c_2^{-2}, c_2^2, \{c_n^m\}; r_0) = zyl(c_2^0, c_2^{-2}, c_2^2; r_0)$$

$$A(c_2^0, c_2^{-2}, c_2^2, \{c_n^m\}; r_0) = sph(c_2^0, c_2^{-2}, c_2^2; r_0),$$

where $c_2^0$, $c_2^{-2}$, $c_2^2$ represent second-order Zernike coefficients and $c_n^m$ with $n \geq 3$ higher-order Zernike coefficients of the wavefront in the notation of the OSA standard, cf. for example Jason Porter et al. "Adaptive Optics for Vision Science", Wiley (2006), p. 522. The parameter $r_0$ represents the pupil radius. To this end, the method preferably comprises detecting a pupil radius $r_0$. Moreover, the method preferably comprises determining second-order Zernike coefficients $(c_2^0, c_2^{-2}, c_2^2)$.

A preferred embodiment taking into consideration the higher-order aberrations in the determination of the transformed spherocylindrical refraction, i.e. in a transformation of the spherocylindrical values in dependence on the second secondary coefficients, is determined by:

$$Sph(c_2^0, c_2^{-2}, c_2^2, \{c_n^m\}) = sph(c_2^0, c_2^{-2} + \sqrt{5/3}c_4^{-2}, c_2^2 + \sqrt{5/3}c_4^2)$$

$$Zyl(c_2^0, c_2^{-2}, c_2^2, \{c_n^m\}) = zyl(c_2^{-2} + \sqrt{5/3}c_4^{-2}, c_2^2 + \sqrt{5/3}c_4^2)$$

$$A(c_2^0, c_2^{-2}, c_2^2, \{c_n^m\}) = a(c_2^{-2} + \sqrt{5/3}c_4^{-2}, c_2^2 + \sqrt{5/3}c_4^2)$$

A further alternative preferred embodiment is determined by:

$$Sph(c_2^0, c_2^{-2}, c_2^2, \{c_n^m\}) = sph(c_2^0 + \sqrt{5/3}c_4^0, c_2^2 + \sqrt{5/3}c_4^{-2}, c_2^2 + \sqrt{5/3}c_4^2)$$

$$Zyl(c_2^0, c_2^{-2}, c_2^2, \{c_n^m\}) = zyl(c_2^{-2} + \sqrt{5/3}c_4^{-2}, c_2^2 + \sqrt{5/3}c_4^2)$$

$$A(c_2^0, c_2^{-2}, c_2^2, \{c_n^m\}) = a(c_2^{-2} + \sqrt{5/3}c_4^{-2}, c_2^2 + \sqrt{5/3}c_4^2)$$

A further preferred embodiment is determined by:

$$Sph(c_2^0, c_2^{-2}, c_2^2, \{c_n^m\}) = sph(c_2^0 + 2\sqrt{15}c_4^0, c_2^{-2} + 3\sqrt{15}c_4^{-2}, c_2^2 + 3\sqrt{15}c_4^2)$$

$$Zyl(c_2^0, c_2^{-2}, c_2^2, \{c_n^m\}) = zyl(c_2^{-2} + 3\sqrt{15}c_4^{-2}, c_2^2 + 3\sqrt{15}c_4^2)$$

$$A(c_2^0, c_2^{-2}, c_2^2, \{c_n^m\}) = a(c_2^{-2} + 3\sqrt{15}c_4^{-2}, c_2^2 + 3\sqrt{15}c_4^2)$$

Slightly more general, a preferred embodiment is determined by:

$$Sph(c_2^0, c_2^{-2}, c_2^2\{c_n^m\}) = sph(c_2^0 + \Delta c_2^0, c_2^{-2} + \Delta c_2^{-2}, c_2^2 \Delta c_2^2)$$

$$Zyl(c_2^0, c_2^{-2}, c_2^2\{c_n^m\}) = zyl(c_2^{-2} + \Delta c_2^{-2}, c_2^2 \Delta c_2^2)$$

$$A(c_2^0, c_2^{-2}, c_2^2\{c_n^m\}) = a(c_2^{-2} + \Delta c_2^{-2}, c_2^2 \Delta c_2^2)$$

in which the changes $\Delta c_2^0$, $\Delta c_2^{-2}$, $\Delta c_2^2$ are functions (particularly continuous functions) of the higher-order Zernike coefficients $c_n^m$ of the wavefront, where $n \geq 3$.

Preferably, collecting prescription data comprises collecting first prescription data for a first object distance and second prescription data for a second object distance. Specifically, the influence of the object distance on the pupil size can be taken into consideration individually. In this way, a changed pupil size mainly influences the higher-order aberrations.

Preferably, the method further comprises:
specifying an object distance model A1(x, y), where A1 designates the object distance and (x,y) a visual point or visual spot of the spectacle lens in a specified or specifiable direction of sight;
specifying a function $r_0 = g$ (A1), which describes the dependence of a pupil size $r_0$ on the object distance A1;
determining a pupil size for the at least one main ray (10) on the basis of the object distance model A1(x, y) and the specified function $r_0 = g(A1)$.

Preferably, the spectacle lens to be optimized is a progressive spectacle lens.

In a further aspect, the invention provides a device for calculating and optimizing a spectacle lens, comprising:
a surface model database for specifying at least one surface for the spectacle lens to be calculated or optimized;
main ray determining means for determining the course of a main ray (10) through at least one visual point (i) of said at least one surface;
primary coefficient determining means for determining a first primary set ($s_{io}$) and a second primary set ($e_{iok}$) of coefficients of the local aberration of a local wavefront (18) going out from the at least one visual point (i) in a vicinity of the main ray (10), wherein the first primary set of coefficients ($s_{io}$) specifies the spherical and astigmatic aberration of the outgoing local wavefront and the second primary set of coefficients ($e_{iok}$) specifies a further higher-order aberration (k>2) of the outgoing local wavefront;
a propagation model database for specifying at least one function $e_{pk} = f(e_{ok})$, which assigns a second secondary set of coefficients ($e_{pk}$)) to a second primary set of coefficients ($e_{ok}$), said second secondary set of coefficients specifying the at least one higher-order aberration of a propagated wavefront;
secondary coefficient determining means for determining a higher-order aberration of a local wavefront propagated starting from the at least one visual point (i) along the main ray depending on at least the second primary set of coefficients ($e_{iok}$) on the basis of the specified function $e_{pk}=f(e_{ok})$; and calculating or optimizing means adapted to calculate or optimize the at least one surface of the spectacle lens taking into consideration the determined higher-order aberration of the propagated local wavefront.

Further, the invention provides a computer program product adapted, when loaded and executed on a computer, to perform a method for calculating or optimizing a spectacle lens according to the present invention, particularly in a preferred embodiment thereof.

Moreover, the invention provides a storage medium with a computer program stored thereon, the computer program being adapted, when loaded and executed on a computer, to perform a method for calculating or optimizing a spectacle lens according to the present invention, particularly in a preferred embodiment thereof.

In addition, the invention provides a method for producing a spectacle lens, comprising:

calculating or optimizing a spectacle lens according to the method for calculating or optimizing a spectacle lens according to the present invention, particularly in a preferred embodiment thereof;

manufacturing the thus calculated or optimized spectacle lens.

Moreover, the invention provides a device for producing a spectacle lens, comprising:

calculating and optimizing means adapted to calculate or optimize a spectacle lens according to the present invention, particularly in a preferred embodiment thereof;

machining means adapted to finish the spectacle lens.

Further, the invention provides a use of a spectacle lens, produced according to the preferred production method, in a predetermined average or individual wearing position of the spectacle lens in front of the eyes of a specific spectacles wearer, for correcting a visual defect of the spectacles wearer.

DRAWINGS

Figure 2:
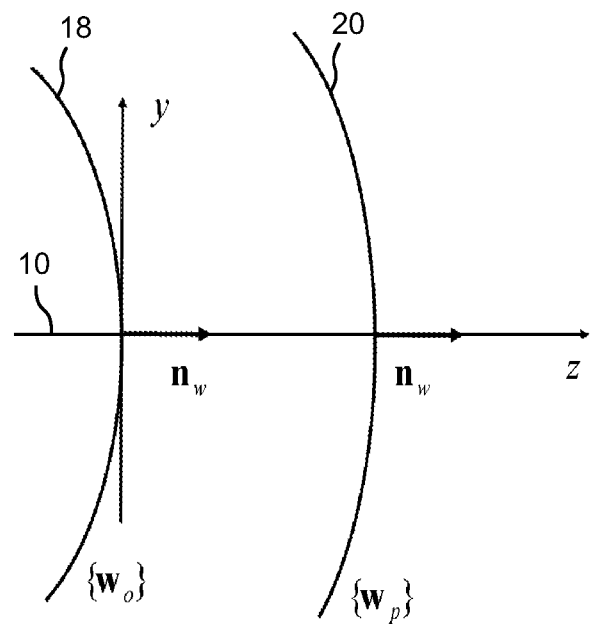
Figure 3:
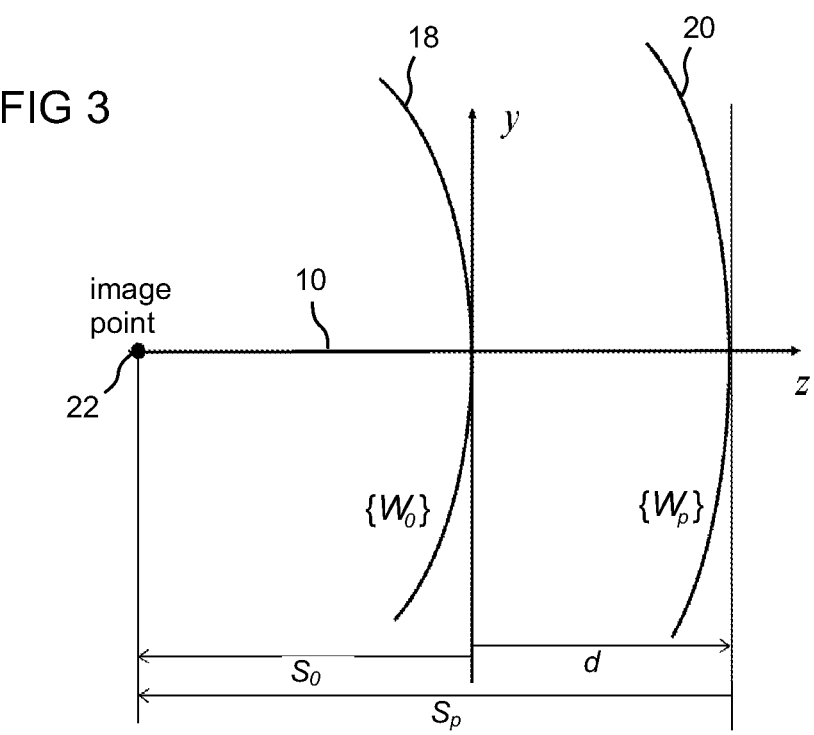
Figure 4:
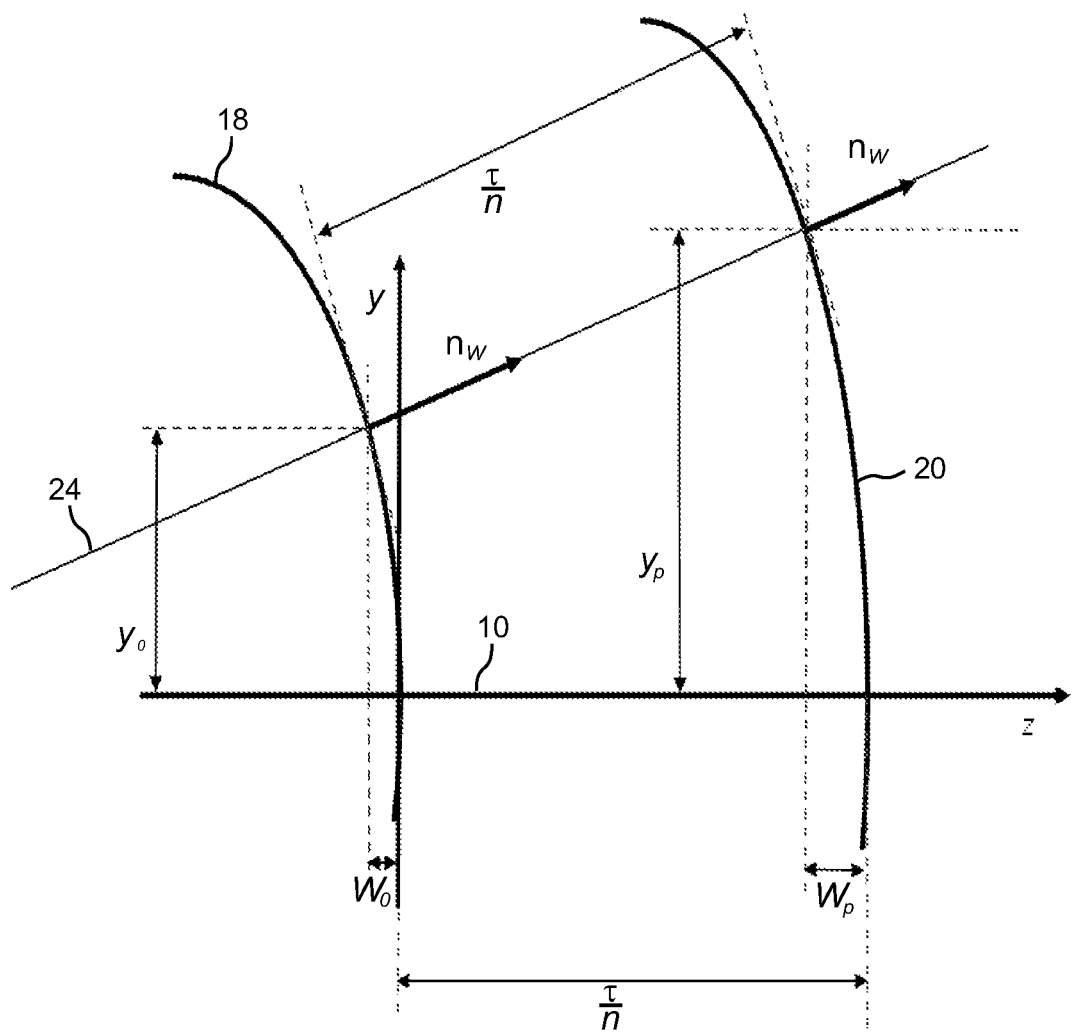
Figure 5:
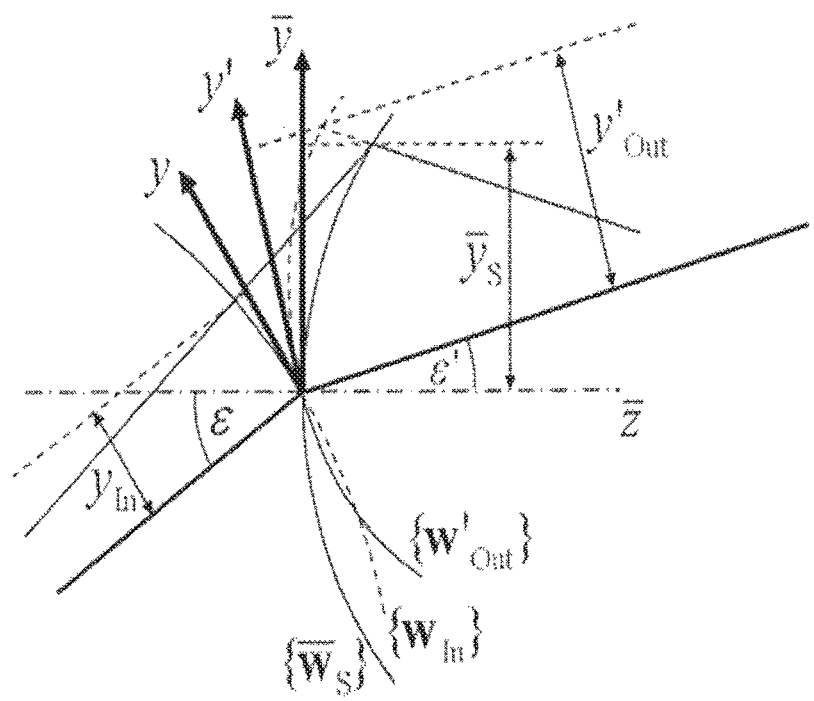

Preferred embodiments of the invention will be described by way of example in the following with reference to the accompanying drawings, which show:

FIG. 1 a schematic illustration of the physiological and physical model of a spectacle lens along with a ray course in a predetermined wearing position;

FIG. 2 a schematic illustration of a coordinate system with an original wavefront and a propagated wavefront;

FIG. 3 a schematic illustration of a spherical wavefront with a vergence distance $s_o$ at a distance d from a propagated wavefront with the vergence distance $s_p$;

FIG. 4 a schematic illustration of the process of propagation of a wavefront;

FIG. 5 a schematic illustration of local coordinate systems of a refractive surface, an incoming and an outgoing wavefront; and FIG. 6 a flow chart for illustrating a method for optimizing an individual spectacle lens according to an embodiment of the invention.

DETAILED DESCRIPTION

FIG. 1 shows a schematic illustration of the physiological and physical model of a spectacle lens in a predetermined wearing position along with an exemplary ray course, on which an individual spectacle lens calculation or optimization according to a preferred embodiment of the invention is based.

Here, preferably only one single ray (the main ray 10) is calculated per visual point of the spectacle lens, but further also the derivatives of the vertex depths of the wavefront according to the transversal coordinates (perpendicular to the main ray). These derivatives are taken into consideration up to the desired orders, wherein the second derivatives describe the local curvature properties of the wavefront and the higher derivatives are related to the higher-order aberrations.

In the tracing of light through the spectacle lens, the local derivatives of the wavefronts are ultimately determined at a suitable position in the ray course in order to compare them with the required values of the refraction of the spectacles wearer there. In a preferred embodiment, this position is for example the vertex sphere or the entrance pupil of the eye 12. To this end, it is assumed that a spherical wavefront originates at an object point and propagates to the first spectacle lens surface 14. There, it is refracted and subsequently it propagates (ST2) up to the second spectacle lens surface 16, where it is refracted again. If further surfaces to be considered exist, the alternation of propagation and refraction is continued until the last boundary surface has been passed, and the last propagation (ST4) then takes place from this last boundary surface to the vertex sphere (or the entrance pupil of the eye).

In the following, the propagation of the wavefront according to a preferred embodiment of the present invention will be described in more detail. These statements can e.g. be applied to the propagation of the wavefront between the two spectacle lens surfaces and/or to the propagation of the wavefront from the rear spectacle lens surface to the vertex sphere.

As illustrated in FIG. 2, preferably a Cartesian coordinate system (with an x axis, a y axis, and a z axis) is defined, the origin of which being at the intersection point of the main ray 10 with the original wavefront 18 for a predetermined main ray 10. The z axis preferably points in the direction of the main ray 10. The directions of the x axis and the y axis are preferably selected to be perpendicular to the z axis and perpendicular to each other such that the coordinate system is right-handed. If the original wavefront is assumed to be a wavefront at a refractive surface, i.e. a surface of the spectacle lens, the x axis and/or the y axis is preferably selected to be parallel to the surface or surface tangent in the penetration point of the main ray. In another preferred embodiment, the x axis and the y axis are selected to be parallel to the main curvatures of the original wavefront 18.

Preferably, a description of the wavefront according to $$w(x,y)=(x,y,w(x,y)) \quad (1)$$

is assumed, where the value $w(x,y)$ is represented by $$w(x, y) = \sum_{k=0}^{\infty} \sum_{m=0}^{k} \frac{a_{m,k-m}}{m!(k-m)!} x^m y^{k-m} \quad (2)$$

by means of the coefficients $$a_{m,k-m} = \frac{\partial^k}{\partial x^m \partial y^{k-m}} w(x, y) \bigg|_{x=0, y=0}. \quad (3)$$

Thus, the connection between the coefficients $a_{k_x,k_y}$ and the local aberrations $E_{k_x,k_y}$ can be described by:

$$E_{k_x,k_y} = n a_{k_x,k_y} E_{2,0} = S_{xx} n a_{In,2,0} E_{1,1} = S_{xy} = n a_{1,1} E_0,$$
$$2 = S_{yy} = n a_{0,2} E_{3,0} = n a_{3,0}$$

For aberrations up to the second order, the propagation of a spherical wavefront with the vergence $S_o = n/s_o$ of the original wavefront in a surrounding around a main ray can preferably be expressed in a known manner by the propagation equation $$S_p = \frac{1}{1 - \frac{d}{n} S_o} S_o \tag{4}$$

where $S_p = n/s_p$ designates the vergence of the propagated wavefront. As illustrated in FIG. 3, $s_o$ and $s_p$ designate the vertex distance of the original wavefront 18 and the propagated wavefront 20, respectively, (distance along the main ray 10 from the wavefront to the image point 22). n designates the refractive index and d the propagation distance.

By an extension to three dimensions, the spherocylindrical form of the wavefront can be represented as follows. First of all, the curvatures $1/s_o$ and $1/s_p$ are identified with the second derivatives of the vertex depths of the original wavefront 18 and the propagated wavefront 20, respectively. In the three-dimensional representation, the two derivatives $w_o^{(2,0)} = \partial^2 w_o / \partial x^2$, $w_o^{(1,1)} = \partial^2 w_o / \partial x \partial y$, $w_o^{(0,2)} = \partial^2 w_o / \partial y^2$ the original wavefront 18 and correspondingly for the propagated wavefront 20 are respectively summarized in form of a vergence matrix:

$$S_o = \begin{pmatrix} S_{oxx} & S_{oxy} \\ S_{oxy} & S_{oyy} \end{pmatrix} = n \begin{pmatrix} w_o^{(2,0)} & w_o^{(1,1)} \\ w_o^{(1,1)} & w_o^{(0,2)} \end{pmatrix}, \tag{5}$$

$$S_p = \begin{pmatrix} S_{pxx} & S_{pxy} \\ S_{pxy} & S_{pyy} \end{pmatrix} = n \begin{pmatrix} w_p^{(2,0)} & w_p^{(1,1)} \\ w_p^{(1,1)} & w_p^{(0,2)} \end{pmatrix}$$

According to $$S_{oxx} = \left(Sph + \frac{Cyl}{2}\right) - \frac{Cyl}{2} \cos 2\alpha \tag{6}$$

$$S_{oxy} = -\frac{Cyl}{2} \sin 2\alpha$$

$$S_{oyy} = \left(Sph + \frac{Cyl}{2}\right) + \frac{Cyl}{2} \cos 2\alpha$$

(and analogously for the propagated wavefront) the components of the respective vergence matrix are connected with the known parameters of spherical power Sph, the magnitude Cyl of cylindrical power, and the cylinder axis a of the cylindrical power. By means of the representation in form of the vergence matrix, by analogy with equation (4), the propagation of an astigmatic wavefront can be represented via the generalized propagation equation $$S_p = \frac{1}{1 - \frac{d}{n} S_o} S_o \tag{7}$$

with the identity matrix $$1 = \begin{pmatrix} 1 & 0 \\ 0 & 1 \end{pmatrix}.$$

Equivalent to this representation in form of the vergence matrix, $$s_o = \begin{pmatrix} S_{oxx} \\ S_{oxy} \\ S_{oyy} \end{pmatrix} = n \begin{pmatrix} w_o^{(2,0)} \\ w_o^{(1,1)} \\ w_o^{(0,2)} \end{pmatrix}, \tag{8}$$

$$s_p = \begin{pmatrix} S_{pxx} \\ S_{pxy} \\ S_{pyy} \end{pmatrix} = n \begin{pmatrix} w_p^{(2,0)} \\ w_p^{(1,1)} \\ w_p^{(0,2)} \end{pmatrix}$$

are introduced as power vectors in the three-dimensional vector space for the original wavefront 18 and the propagated wavefront 20.

Now, for consideration of higher-order aberrations in the propagation of the wavefront, corresponding vectors $e_k$ of the dimension k+1 are introduced:

$$e_{ok} = \begin{pmatrix} E_{ox \ldots xx} \\ E_{ox \ldots xy} \\ \vdots \\ E_{oy \ldots yy} \end{pmatrix} := n \begin{pmatrix} w_o^{(k,0)} \\ w_o^{(k-1,1)} \\ \vdots \\ w_o^{(0,k)} \end{pmatrix}, \tag{9}$$

$$e_{pk} = \begin{pmatrix} E_{px \ldots xx} \\ E_{px \ldots xy} \\ \vdots \\ E_{py \ldots yy} \end{pmatrix} := n \begin{pmatrix} w_o^{(k,0)} \\ w_o^{(k-1,1)} \\ \vdots \\ w_o^{(0,k)} \end{pmatrix}$$

For further consideration, at first only a two-dimensional representation will be described for reasons of simplification. Here, some point on the original wavefront (r=o) or the propagated wavefront (r=p) is described by $$w_r(y) = \begin{pmatrix} y \\ w_r(y) \end{pmatrix} \tag{10}$$

where $w_r(y)$ is described by:

$$w_r(y) = \sum_{k=0}^{\infty} \frac{a_{r,k}}{k!} y^k \tag{11}$$

The coefficients $a_{o,k}$ of the original wavefront 18 correspond to the derivatives of the wavefront with y=0:

$$a_{o,k} = \left. \frac{\partial^k}{\partial y^k} w_o(y) \right|_{y=0} = w_o^{(k)}(0) \tag{12}$$

In two dimensions, the vergence matrix $S_o$ in equation (5) is reduced to a scalar $E_{o,k} = n w_o^{(k)} = n a_{o,k}$. For second or third-order aberrations, e.g. $S_o = E_{o,2} = n w_o^{(2)} = n a_{o,2}$, $E_{o,3} = n w_o^{(k)} = n a_{o,3}$, etc. result. The same applies to the propagated wavefront 20.

Here, it is to be noted that any wavefront at the intersection point with the main ray 10 is not inclined with respect to the z axis. Since the z axis points along the direction of the main ray 10, it is perpendicular to the original and propagated wavefronts in the intersection points of the main ray 10 with the wavefronts 18, 20. Moreover, since the origin of the coordinate system is at the original wavefront 18, it holds for the coefficients that: $a_{o,0} = 0$, $a_{o,1} = 0$, $a_{p,0} = d$, and $a_{p,1} = 0$ In two dimensions, the normal vector $n_w(y)$ for a wavefront $w(y)$ results from $n_w(y) = (-w^{(1)}(y), 1)^T / \sqrt{1 + w^{(1)}(y)^2}$, Where $w^{(1)} = \partial w / \partial y$. For Reasons of a simplified notation, first of all $v \equiv w^{(1)}$ and the following function is introduced:

$$n(v) := \frac{1}{\sqrt{1+v^2}} \begin{pmatrix} -v \\ 1 \end{pmatrix} \tag{13}$$

As derivatives $n^{(i)}(0) \equiv \partial^i / \partial v^i \, n(v)|_{v=0}$ of this function there result:

$$n(0) := \begin{pmatrix} 0 \\ 1 \end{pmatrix}, n^{(1)}(0) := \begin{pmatrix} -1 \\ 0 \end{pmatrix}, n^{(2)}(0) := \begin{pmatrix} 0 \\ -1 \end{pmatrix}, \tag{14}$$

$$n^{(3)}(0) := \begin{pmatrix} 3 \\ 0 \end{pmatrix}, n^{(4)}(0) := \begin{pmatrix} 0 \\ 9 \end{pmatrix}, etc.$$

The normal vector, which is perpendicular to both the original wavefront 18 and the propagated wavefront 20, can be designated uniformly with $n_w$. Thus, for the first derivative of the normal vector there is determined:

$$\left. \frac{\partial}{\partial y} n_w(y) \right|_{y=0} \equiv n_w^{(1)}(0) = n^{(1)}(0) w_o^{(2)}(0) = \begin{pmatrix} -1 \\ 0 \end{pmatrix} w_o^{(2)}(0) \tag{15}$$

The same applies to the higher derivatives.

With the local aberrations of the original wavefront 18, the corresponding coefficients $a_k$ and, equivalent thereto, the derivatives of the wavefront are directly defined as well. Subsequently, the propagated wavefront 20 is determined therefrom particularly by determining its derivatives or coefficients $a_k$ for all orders $2 \le k \le k_0$ up to the desired value $k_0$, and thus the values of the local aberrations of the propagated wavefront 20 are determined.

As a starting point, the following situation with respect to FIG. 4 will be considered in an illustrative way. While the main ray 10 and the coordinate system are fixed, a neighboring ray 24 scans the original wavefront 18 ($\{w_o\}$) and strikes it in a section $y_o \ne 0$. From there, it propagates further to the propagated wavefront 20 ($\{w_p\}$). As illustrated in FIG. 4, $y_o$ designates the projection of the intersection point of the neighboring ray 24 with the original wavefront $\{w_o\}$ to the y axis, while analogously the projection of the intersection point with the propagated wavefront $\{w_p\}$ to the y axis is designated with $y_p$.

The vector $w_o = w_o(y_o)$ (cf. equation (10)) points to the intersection point of the neighboring ray 24 with the original wavefront 18, and the optical path difference (OPD) with respect to the propagated wavefront 20 is designated with $\tau$. Accordingly, the vector from the original wavefront 18 to the propagated surface 20 is represented by $\tau/n \, n_w$. Thus, it results for the vector to the corresponding point of the propagated wavefront: $w_p = w_o + \tau/n \, n_w$. As a basic equation there is introduced:

$$\begin{pmatrix} y_o \\ w_o(y_o) \end{pmatrix} + \frac{\tau}{n} n_w = \begin{pmatrix} y_p \\ w_p(y_p) \end{pmatrix} \tag{16}$$

Now, from this equation, the desired relations are derived order by order. Here, $y_p$ is preferably used as a free variable, on which $y_o$ depends in turn. For solving the equation, first of all the vector $$p(y_p) = \begin{pmatrix} y_o(y_p) \\ w_p(y_p) \end{pmatrix} \tag{17}$$

on the boundary condition $$p(0) = \begin{pmatrix} 0 \\ \frac{\tau}{n} \end{pmatrix}$$

can be introduced. Based on this, the following function is introduced for the further consideration:

$$f(p, y_p) = \begin{pmatrix} y_o + \frac{\tau}{n} n_{w,y}(w_o^{(1)}(y_o)) - y_p \\ w_o(y_o) + \frac{\tau}{n} n_{w,z}(w_o^{(1)}(y_o)) - w_p \end{pmatrix} \tag{18}$$

where $(p_1, p_2) = (y_o, w_p)$ are the components of p. Now, if $p = p(y_p)$, the equation (16) can be represented in a compact form by:

$$f(p(y_p), y_p) = 0 \tag{19}$$

The derivatives of this function according to $y_p$ are preferably expressed by the following system of differential equations:

$$\sum_{j=1}^{2} \frac{\partial f_i}{\partial p_j} p_j^{(1)}(y_p) + \frac{\partial f_i}{\partial y_p} = 0, \tag{20}$$

$i = 1, 2$ where the matrix with the elements $A_{ij} := \partial f_i / \partial p_j$ is referred to as a Jacobi matrix A. The Jacobi matrix A thus reads $$A := \begin{pmatrix} \frac{\partial f_1}{\partial y_o} & \frac{\partial f_1}{\partial w_p} \\ \frac{\partial f_2}{\partial y_o} & \frac{\partial f_2}{\partial w_p} \end{pmatrix} = \begin{pmatrix} 1 + \frac{\tau}{n} n_{w,y}^{(1)} w_o^{(2)} & 0 \\ w_o^{(1)} + \frac{\tau}{n} n_{w,z}^{(1)} w_o^{(2)} & -1 \end{pmatrix} \tag{21}$$

The terms appearing in this equation are to be understood as $w_o^{(1)} \equiv w_o^{(1)}(y_o)$, $w_o^{(2)} \equiv w_o^{(2)}(y_o)$, $n_{w,y} \equiv n_{w,y}(w_o^{(1)}(y_o))$, $n_{w,y}^{(1)} \equiv n_{w,y}^{(1)}(w_o^{(1)}(y_o))$, etc., where $y_o, w_p$ are in turn themselves functions of $y_p$.

The derivative vector $\partial f_i / \partial y_p$ can be summarized as $$b := \frac{\partial f}{\partial y_p} = \begin{pmatrix} 1 \\ 0 \end{pmatrix} \quad (22)$$

Thus, the above differential equation system can be represented as:

$$A(p(y_p))p^{(1)}(y_p) = b \quad (23)$$

Formally, this equation is solved by:

$$p^{(1)}(y_p) = A(p(y_p))^{-1} b \quad (24)$$

with the boundary condition $$p(0) = \begin{pmatrix} 0 \\ \frac{\tau}{n} \end{pmatrix}.$$

Based on this, the equation system for higher-order aberrations is preferably solved recursively as follows:

$$p^{(1)}(0) = A^{-1} b \quad (25)$$
$$p^{(2)}(0) = (A^{-1})^{(1)} b$$
$$\ldots$$
$$p^{(k)}(0) = (A^{-1})^{(k-1)} b,$$

with the abbreviatory designations $A^{-1} = A(p(0))^{-1} = A(0)^{-1}$ $$(A^{-1})^{(1)} = \frac{d}{dy_p} A(p(y_p))^{-1} \bigg|_{y_p=0}, \ldots, (A^{-1})^{(k-1)} = \frac{d^{k-1}}{dy_p^{k-1}} A(p(y_p))^{-1} \bigg|_{y_p=0}.$$

In an alternative approach, it is suggested performing the recursion on the basis of equation (23) instead of equation (24). The first (k−1) derivatives of equation (23) yield:

$$Ap^{(1)}(0) = b \quad \text{(a)} \quad (26)$$
$$A^{(1)} p^{(1)}(0) + A p^{(2)}(0) = 0 \quad \text{(b)}$$
$$A^{(2)} p^{(1)}(0) + 2 A^{(1)} p^{(2)}(0) + A p^{(3)}(0) = 0 \quad \text{(c)}$$
$$\ldots$$
$$\sum_{j=1}^{k} \binom{k-1}{j-1} A^{(k-j)} p^{(j)}(0) = 0, k \geq 2 \quad \text{(d)}$$

where $$A = A(p(0)) = A(0),$$
$$A^{(1)} = \frac{d}{dy_p} A(p(y_p)) \bigg|_{y_p=0}, \ldots, A^{(k-j)} = \frac{d^{k-j}}{dy_p^{k-j}} A(p(y_p)) \bigg|_{y_p=0}$$

designate the total derivatives of the function. Formally, these equations are solved by:

$$p^{(1)}(0) = A^{-1} b, \quad k = 1 \quad (27)$$

-continued $$p^{(k)}(0) = -A^{-1} \sum_{j=1}^{k-1} \binom{k-1}{j-1} A^{(k-j)} p^{(j)}(0), \quad k \geq 2.$$

In order to obtain $A(0)^{-1}$, preferably equation (21) is evaluated for p=0 and equation (14) is applied. This yields:

$$A(0) = \begin{pmatrix} 1 + \frac{\tau}{n} w_o^{(2)} & 0 \\ 0 & -1 \end{pmatrix} \Rightarrow A(0)^{-1} = \begin{pmatrix} \frac{1}{1 - \frac{\tau}{n} w_o^{(2)}} & 0 \\ 0 & -1 \end{pmatrix} \quad (28)$$

from which it results for $p^{(1)}(0)$:

$$p^{(1)}(0) = A^{-1} b = \begin{pmatrix} \frac{1}{1 - \frac{\tau}{n} w_o^{(2)}} \\ 0 \end{pmatrix} \quad (29)$$

In turn, this means $$y_o^{(1)}(0) = \frac{1}{1 - \frac{\tau}{n} w_o^{(2)}} \text{ and } w_p^{(1)}(0) = 0.$$

For orders $k \geq 2$, preferably equation (27) is applied. The derivatives $$A^{(1)} = \frac{d}{dy_p} A(p(y_p)) \bigg|_{y_p=0},$$

etc. are preferably determined from equation (21) and preferably equation (14) is applied again. Thus, it results in the second order:

$$w_p^{(2)} = \frac{1}{1 - \frac{\tau}{n} w_o^{(2)}} w_o^{(2)} \quad (30)$$

which basically corresponds to the above-described propagation equation. The higher orders can analogously be expressed by:

$$w_p^{(3)} = \left( \frac{1}{1 - \frac{\tau}{n} w_o^{(2)}} \right)^3 w_o^{(3)} \quad (31)$$

$$w_p^{(4)} = \left( \frac{1}{1 - \frac{\tau}{n} w_o^{(2)}} \right)^4 \left( w_o^{(4)} + 3 \frac{\tau}{n} \left( \frac{1}{1 - \frac{\tau}{n} w_o^{(2)}} \right) w_o^{(3)2} - w_o^{(2)4} \right)$$

$$w_p^{(5)} = \left( \frac{1}{1 - \frac{\tau}{n} w_o^{(2)}} \right)^5 \left( w_o^{(5)} + 5 \frac{1}{1 - \frac{\tau}{n} w_o^{(2)}} \frac{\tau}{n} \right.$$

-continued $$w_o^{(3)}\left(2w_o^{(4)} + 3\frac{1}{1-\frac{\tau}{n}w_o^{(2)}}\frac{\tau}{n}w_o^{(3)2} - 6w_o^{(2)3}\right)\right)$$

...

Equation (31) correspondingly applies to the derivatives and the coefficients $a_{o,k}$ and $a_{p,k}$ due to equations (10) to (12). Now, if one replaces $d=\tau/n$ and $$\beta = \frac{1}{1-\frac{d}{n}S_o},$$

the local aberrations can be expressed as follows:

$$S_p = \beta S_o \tag{32}$$

$$E_{p,3} = \beta^3 E_{o,3}$$

$$E_{p,4} = \beta^4\left(E_{o,4} + 3\frac{d}{n}\left(\beta E_{o,3}^2 - \frac{S_o^4}{n^2}\right)\right)$$

$$E_{p,5} = \beta^5\left(E_{o,5} + 5\beta\frac{d}{n}E_{o,3}\left(2E_{o,4} + 3\beta\frac{d}{n}E_{o,3}^2 - 6\frac{S_o^3}{n^2}\right)\right)$$

$$E_{p,6} = $$

$$\beta^6\left(E_{o,6} + 5\beta\frac{d}{n}\left(3E_{o,3}E_{o,5} + 21\beta\frac{d}{n}E_{o,3}^2 E_{o,4} - 12\frac{S_o^3 E_{o,4}}{n^2} + 2E_{o,4} - \right.\right.$$

$$\left.\left. 9\beta S_o^2 E_{o,3}^2 \frac{3+4\frac{d}{n}S_o}{n^2} + 21\left(\beta\frac{d}{n}\right)^2 E_{o,3}^4 + 9S_o^6 \frac{3+\frac{d}{n}S_o}{n^4}\right)\right)$$

For $2<k\leq 6$, this is preferably represented by $$E_{p,k} = \beta^k(E_{o,k} + R_k) \tag{33}$$

in a generalized way, where in $R_k$ all wavefront derivatives $E_{o,j}$ of the lower orders (j<k) are expressed in form of local aberrations.

Even if a three-dimensional representation is more complex, it can basically be established by analogy with the two-dimensional representation. Therefore, for the fully three-dimensional representation, only a few essential additional considerations will be described in the following.

Preferably, the original wavefront can be expressed by the 3D vector $$w_o(x, y) = \begin{pmatrix} x \\ y \\ w_o(x, y) \end{pmatrix} \tag{34}$$

where $w_o(x, y)$ is determined according to equation (2), and the relationship between the coefficients and the derivatives is determined according to equation (3). The connection between the coefficients and the local aberrations results from a multiplication of the coefficient by the refractive index. Preferably, by analogy with equation (13), formal vectors are introduced:

$$n(u, v) := \frac{1}{\sqrt{1+u^2+v^2}}\begin{pmatrix} -u \\ -v \\ 1 \end{pmatrix} \tag{35}$$

so that the normal vectors with respect to a surface $w(x,y):=(x,y,w(x,y))^T$ are determined by:

$$\frac{w^{(1,0)} \times w^{(0,1)}}{|w^{(1,0)} \times w^{(0,1)}|} = \frac{1}{\sqrt{1+w^{(1,0)2}+w^{(0,1)2}}}\begin{pmatrix} -w^{(1,0)} \\ -w^{(0,1)} \\ 1 \end{pmatrix} = n(w^{(1,0)}, w^{(0,1)}) = n(\nabla w)$$

In the intersection point, it thus results $n_w(0,0)=(0,0,1)^T$, and the derivatives according to equation (14) are preferably determined from equation (35).

As the basis for the consideration of a connection between the original and propagated wavefronts, preferably substantially equation (16) is used, with the difference that now x and y components are considered at the same time. As a vector of unknown functions, there is preferably determined:

$$p(x_p, y_p) = \begin{pmatrix} x_o(x_p, y_p) \\ y_o(x_p, y_p) \\ w_p(x_p, y_p) \end{pmatrix} \tag{36}$$

and by analogy with equation (16), there is preferably used for the three-dimensional consideration:

$$f(p(x_p,y_p),x_p,y_p)=0 \tag{37}$$

where f is analogous to equation (18).

An importance difference compared to the two-dimensional consideration is that in the three-dimensional case two arguments exist, with respect to which the derivatives are taken into account. Thus, already in the first order, two equations are considered:

$$A(p(x_p,y_p))p^{(1,0)}(x_p,y_p)=b_x$$

$$A(p(x_p,y_p))p^{(0,1)}(x_p,y_p)=b_y \tag{38}$$

where the inhomogeneity is described by the column vectors:

$$b_x = -\frac{\partial f}{\partial x_p} = (1\ 0\ 0)^T, b_y = -\frac{\partial f}{\partial y_p} = (0\ 1\ 0)^T \tag{39}$$

The Jacobi matrix $A(p(x_2,y_2))$ with the elements $A_{ij}:=\partial f_i/\partial p_j$ is the same for both equations and analogous to equation (21), but now in the size 3×3.

$$A(p(x_p, y_p)) = \tag{40}$$

$$\begin{pmatrix} 1+\frac{\tau}{n}(n_{w,x}^{(0,1)}w_o^{(1,1)} + n_{w,x}^{(1,0)}w_o^{(2,0)}) & \frac{\tau}{n}(n_{w,x}^{(0,1)}w_o^{(0,2)} + n_{w,x}^{(1,0)}w_o^{(1,1)}) & 0 \\ \frac{\tau}{n}(n_{w,y}^{(0,1)}w_o^{(1,1)} + n_{w,y}^{(1,0)}w_o^{(2,0)}) & 1+\frac{\tau}{n}(n_{w,y}^{(0,1)}w_o^{(0,2)} + n_{w,y}^{(1,0)}w_o^{(1,1)}) & 0 \\ w_o^{(1,0)} + \frac{\tau}{n}(n_{w,z}^{(0,1)}w_o^{(1,1)} + n_{w,z}^{(1,0)}w_o^{(2,0)}) & w_o^{(0,1)} + \frac{\tau}{n}(n_{w,z}^{(0,1)}w_o^{(0,2)} + n_{w,z}^{(1,0)}w_o^{(1,1)}) & -1 \end{pmatrix}$$

The direct solutions by analogy with equation (25) are now determined by $$p^{(1,0)}(0, 0) = A^{-1}b_x \tag{41}$$

$$p^{(0,1)}(0, 0) = A^{-1}b_y$$

$$p^{(2,0)}(0, 0) = (A^{-1})^{(1,0)}|b_x$$

$$p^{(1,1)}(0, 0) = (A^{-1})^{(0,1)}b_x = (A^{-1})^{(1,0)}|b_y$$

$$p^{(0,2)}(0, 0) = (A^{-1})^{(0,1)}b_y$$

...

$$p^{(k_x,k_y)}(0, 0) = \begin{cases} (A^{-1})^{(k_x-1,0)}b_x, & k_x \neq 0, k_y = 0 \\ (A^{-1})^{(k_x-1,k_y)}b_x = (A^{-1})^{(k_x,k_y-1)}b_y, & k_x \neq 0, k_y \neq 0 \\ (A^{-1})^{(0,k_y-1)}b_y, & k_x = 0, k_y \neq 0 \end{cases}$$

where $A^{-1} = A(p(0,0))^{-1} = A(0)^{-1}$, $$(A^{-1})^{(1,0)} = \frac{d}{dx_p} A(p(x_p, y_p))^{-1}\bigg|_{x_p=0, y_p=0},$$

$$(A^{-1})^{(k_x,k_y)} = \frac{d^{k_x}}{dx_p^{k_x}} \frac{d^{k_y}}{dx_p^{k_y}} A(p(x_p, y_p))^{-1}\bigg|_{x_p=0, y_p=0}, \text{etc..}$$

By analogy with equations (28) and (29), it results for the three-dimensional consideration:

$$A(0) = \begin{pmatrix} 1 - \frac{\tau}{n}w_o^{(2,0)} & -\frac{\tau}{n}w_o^{(1,1)} & 0 \\ -\frac{\tau}{n}w_o^{(1,1)} & 1 - \frac{\tau}{n}w_o^{(0,2)} & 0 \\ 0 & 0 & -1 \end{pmatrix} \Rightarrow A(0)^{-1} = \tag{42}$$

$$\begin{pmatrix} \gamma\begin{pmatrix} 1 - \frac{\tau}{n}w_o^{(0,2)} & \frac{\tau}{n}w_o^{(1,1)} \\ \frac{\tau}{n}w_o^{(1,1)} & 1 - \frac{\tau}{n}w_o^{(2,0)} \end{pmatrix} & 0 \\ & 0 \\ 0 \quad 0 & -1 \end{pmatrix}$$

with $$\gamma = \frac{-1}{\det(A(0))} = \frac{1}{1 - \frac{\tau}{n}w_o^{(2,0)} - \left(\frac{\tau}{n}w_o^{(1,1)}\right)^2 - \frac{\tau}{n}w_o^{(0,2)} + \left(\frac{\tau}{n}\right)^2 w_o^{(2,0)}w_o^{(0,2)}}$$

and after application of equations (39) and (41), the solutions $$p^{(1,0)}(0, 0) = \gamma \begin{pmatrix} n(n - \tau w_o^{(0,2)}) \\ n\tau w_o^{(1,1)} \\ 0 \end{pmatrix}, \tag{43}$$

$$p^{(0,1)}(0, 0) = \gamma \begin{pmatrix} n\tau w_o^{(1,1)} \\ n(n - \tau w_o^{(2,0)}) \\ 0 \end{pmatrix}$$

After further application of equations (39) and (41), it results in the second order $$w_p^{(2,0)} = \gamma(\tau/n(w_o^{(1,1)})^2 + (1-\tau/n \, w_o^{(0,2)})w_o^{(2,0)})$$

$$w_p^{(1,1)} = \gamma w_o^{(1,1)}$$

$$w_p^{(0,2)} = \gamma(\tau/n(w_o^{(1,1)})^2 + (1-\tau/n \, w_o^{(2,0)})w_o^{(0,2)}) \tag{44}$$

In a preferred embodiment, the coordinate axes for determination of the propagation are selected or determined such that the x axis and the y axis coincide with the directions of the main curvatures of the original wavefront. It thereby holds that $w_o^{(1,1)}=0$, and the equations (44) are simplified as $$w_p^{(2,0)} = \frac{1}{1 - \frac{\tau}{n}w_o^{(2,0)}} w_o^{(2,0)} \tag{45}$$

$$w_p^{(1,1)} = 0$$

$$w_p^{(0,2)} = \frac{1}{1 - \frac{\tau}{n}w_o^{(0,2)}} w_o^{(0,2)}$$

In a corresponding way, the equations in the third order are preferably expressed as follows:

$$w_p^{(3,0)} = \gamma^3 \Bigg( \left(1 - \frac{\tau}{n}w_o^{(0,2)}\right)^3 w_o^{(3,0)} + \frac{\tau}{n}w_o^{(1,1)}\left(3\left(1 - \frac{\tau}{n}w_o^{(0,2)}\right)^2 w_o^{(2,1)} + \tag{46}$$

$$\frac{\tau}{n}w_o^{(1,1)}\left(\frac{\tau}{n}w_o^{(0,3)}w_o^{(1,1)}\right) + 3\left(1 - \frac{\tau}{n}w_o^{(0,2)}\right)^2 w_o^{(2,1)}\Bigg)\Bigg)$$

$$w_p^{(2,1)} = \gamma^3 \Bigg( w_o^{(2,1)} + \frac{\tau}{n}(w_o^{(1,1)}(2w_o^{(1,2)} + w_o^{(3,0)}) - (2w_o^{(0,2)} + w_o^{(2,0)})w_o^{(2,1)}) +$$

$$\left(\frac{\tau}{n}\right)^2 \left(w_o^{(2,1)}w_o^{(0,2)^2} - 2(w_o^{(1,1)}(w_o^{(1,2)} + w_o^{(3,0)}) - w_o^{(2,0)}w_o^{(2,1)})w_o^{(0,2)} + \right.$$

$$w_o^{(0,3)}w_o^{(1,1)^2} + 2w_o^{(1,1)}(w_o^{(1,1)}w_o^{(2,1)} - w_o^{(1,2)}w_o^{(2,0)})\Bigg) +$$

$$\left(\frac{\tau}{n}\right)^3 \left(w_o^{(1,2)}w_o^{(1,1)^3} - (w_o^{(0,3)}w_o^{(2,0)} + 2w_o^{(0,2)}w_o^{(2,1)})w_o^{(1,1)^2} + \right.$$

$$w_o^{(0,2)}(2w_o^{(1,2)}w_o^{(2,0)} + w_o^{(0,2)}w_o^{(3,0)})w_o^{(1,1)} - w_o^{(0,2)^2}w_o^{(2,0)}w_o^{(2,1)}\Bigg)\Bigg)$$

$$w_p^{(1,2)} = \gamma^3 \Bigg( w_o^{(1,2)} + \frac{\tau}{n}(w_o^{(1,1)}(2w_o^{(2,1)} + w_o^{(0,3)}) - (2w_o^{(2,0)} + w_o^{(0,2)})w_o^{(1,2)}) +$$

$$\left(\frac{\tau}{n}\right)^2 \left(w_o^{(1,2)}w_o^{(2,0)^2} - 2(w_o^{(1,1)}(w_o^{(2,1)} + w_o^{(0,3)}) - w_o^{(0,2)}w_o^{(1,2)})w_o^{(2,0)} + \right.$$

$$w_o^{(3,0)}w_o^{(1,1)^2} + 2w_o^{(1,1)}(w_o^{(1,1)}w_o^{(1,2)} - w_o^{(2,1)}w_o^{(0,2)})\Bigg) +$$

$$\left(\frac{\tau}{n}\right)^3 \left(w_o^{(2,1)}w_o^{(1,1)^3} - (w_o^{(3,0)}w_o^{(0,2)} + 2w_o^{(2,0)}w_o^{(1,2)})w_o^{(1,1)^2} + \right.$$

$$w_o^{(2,0)}(2w_o^{(2,1)}w_o^{(0,2)} + w_o^{(2,0)}w_o^{(0,3)})w_o^{(1,1)} - w_o^{(2,0)^2}w_o^{(0,2)}w_o^{(1,2)}\Bigg)\Bigg)$$

$$w_p^{(0,3)} = \gamma^3 \Bigg( \left(1 - \frac{\tau}{n}w_o^{(2,0)}\right)^3 w_o^{(0,3)} + \frac{\tau}{n}w_o^{(1,1)}\left(3\left(1 - \frac{\tau}{n}w_o^{(2,0)}\right)^2 w_o^{(1,2)} + \right.$$

$$\frac{\tau}{n}w_o^{(1,1)}\left(\frac{\tau}{n}w_o^{(3,0)}w_o^{(1,1)}\right) + 3\left(1 - \frac{\tau}{n}w_o^{(2,0)}\right)^2 w_o^{(2,1)}\Bigg)\Bigg)$$

Now, if one replaces $$d = \frac{\tau}{n} \text{ and } \gamma = \frac{1}{1 - \frac{d}{n}S_{oxx} - \left(\frac{d}{n}S_{oxy}\right)^2 - \frac{d}{n}S_{oyy} + \left(\frac{d}{n}\right)^2 S_{oxx}S_{oyy}},$$

the propagation of the wavefront in the second order in the form of the local aberrations can be expressed as follows:

$$s_p = \gamma \left( s_o + \frac{d}{n}\begin{pmatrix} S_{oxy}^2 - S_{oxx}S_{oyy} \\ 0 \\ S_{oxy}^2 - S_{oxx}S_{oyy} \end{pmatrix} \right) \tag{47}$$

Moreover, if one replaces $$\beta_x = \frac{1}{1 - \frac{d}{n}S_{xx}} \text{ and } \beta_y = \frac{1}{1 - \frac{d}{n}S_{yy}},\quad (5)$$

the propagation of the wavefront in the third order can be described by:

$$e_{p3} = \gamma^3 \begin{pmatrix} \beta_y^{-3} & 3\beta_y^{-2}\frac{d}{n}S_{xy} & 3\beta_y^{-1}\left(\frac{d}{n}S_{xy}\right)^2 & \left(\frac{d}{n}S_{xy}\right)^3 \\ \beta_y^{-2}\frac{d}{n}S_{xy} & \beta_y^{-1}\left(\frac{1}{\gamma} + 3\left(\frac{d}{n}S_{xy}\right)^2\right) & \frac{2}{\gamma}\frac{d}{n}S_{xy} + 3\left(\frac{d}{n}S_{xy}\right)^3 & \beta_x^{-1}\left(\frac{d}{n}S_{xy}\right)^2 \\ \beta_y^{-1}\left(\frac{d}{n}S_{xy}\right)^2 & \frac{2}{\gamma}\frac{d}{n}S_{xy} + 3\left(\frac{d}{n}S_{xy}\right)^3 & \beta_x^{-1}\left(\frac{1}{\gamma} + 3\left(\frac{d}{n}S_{xy}\right)^2\right) & \beta_x^{-2}\frac{d}{n}S_{xy} \\ \left(\frac{d}{n}S_{xy}\right)^3 & 2\beta_x^{-1}\left(\frac{d}{n}S_{xy}\right)^2 & 3\beta_x^{-2}\frac{d}{n}S_{xy} & \beta_x^{-3} \end{pmatrix} e_{o3} \quad (48)$$

In a preferred embodiment, the coordinate axes for determination of the propagation are selected or determined such that the x axis and the y axis coincide with the directions of the main curvatures of the original wavefront. Thereby, the equations (47) and (48) are simplified as $$s_P = \begin{pmatrix} \beta_x & 0 & 0 \\ 0 & 0 & 0 \\ 0 & 0 & \beta_y \end{pmatrix} s_o \quad (49)$$

$$e_{p3} = \begin{pmatrix} \beta_x^3 & 0 & 0 & 0 \\ 0 & \beta_x^2\beta_y & 0 & 0 \\ 0 & 0 & \beta_x\beta_y^2 & 0 \\ 0 & 0 & 0 & \beta_y^3 \end{pmatrix} e_{o3} \quad (50)$$

The propagation of fourth-order aberrations can be determined in a comparatively simply way by:

$$e_{p4} = \begin{pmatrix} \beta_x^4 & \cdots & & \cdots & 0 \\ \vdots & \beta_x^3\beta_y^1 & & & \vdots \\ & & \beta_x^2\beta_y^2 & & \\ \vdots & & & \beta_x^1\beta_y^3 & \vdots \\ 0 & \cdots & & & \beta_y^4 \end{pmatrix} \quad (51)$$

$$\left( e_{o4} + \frac{d}{n} \begin{pmatrix} 3\left(\beta_x E_{oxxx}^2 + \beta_y E_{oxxy}^2 - \frac{S_{oxx}^4}{n^2}\right) \\ 3E_{oxxy}(\beta_x E_{oxxx} + \beta_y E_{oxyy}) \\ \beta_x(2E_{oxxy}^2 + E_{oxxx}E_{oxyy}) + \beta_y(2E_{oxyy}^2 + E_{oxxy}E_{oyyy}) - \left(\frac{S_{oxx}S_{oyy}}{n}\right)^2 \\ 3E_{oxyy}(\beta_x E_{oxxy} + \beta_y E_{oyyy}) \\ 3\left(\beta_x E_{oxyy}^2 + \beta_y E_{oyyy}^2 - \frac{S_{oyy}^4}{n^2}\right) \end{pmatrix} \right)$$

For $2 < k \leq 4$, this is preferably generalized by $$e_{pk} = B_k(e_{ok} + r_k) \quad (52)$$

$$\text{with } B_k = \begin{pmatrix} \beta_x^k & \cdots & & \cdots & 0 \\ \vdots & \beta_x^{k-1}\beta_y^1 & & & \vdots \\ & & \ddots & & \\ \vdots & & & \beta_x^1\beta_y^{k-1} & \vdots \\ 0 & & \cdots & & \beta_y^k \end{pmatrix} \quad (53)$$

where $r_k$ represents a vector in which by analogy with $R_k$ in equation (33) all remainder terms $R_{k_x, k_y}$ are included.

In a preferred embodiment it holds:

$$s_P = T^{(2)}(\hat{R})T^{(2)}(\hat{\beta})\hat{\tilde{s}}_P S(\hat{R})$$

$$e_{p3} = T^{(3)}(\hat{R})T^{(3)}(\hat{\beta})\hat{\tilde{e}}_{p3} S(\hat{R})$$

$$e_{p4} = T^{(4)}(\hat{R})T^{(4)}(\hat{\beta})\hat{\tilde{e}}_{p4} S(\hat{R})$$

etc. (54)

where $s_P$, $e_{p3}$, $e_{p4}$, ... apply in every coordinate system and where $$\hat{\beta} = \begin{pmatrix} \hat{\beta}_{xx} & 0 \\ 0 & \hat{\beta}_{yy} \end{pmatrix}$$

with $$\hat{\beta}_{xx} = \left(1 - \frac{\tau}{n}\hat{w}^{(2,0)}\right)^{-1}$$

$$\hat{\beta}_{yy} = \left(1 - \frac{\tau}{n}\hat{w}^{(0,2)}\right)^{-1}$$

$$\begin{pmatrix} \hat{w}^{(2,0)} \\ \hat{w}^{(1,1)} \\ \hat{w}^{(0,2)} \end{pmatrix} = \frac{1}{2}(w^{(2,0)} + w^{(0,2)}) \begin{pmatrix} 1 \\ 0 \\ 1 \end{pmatrix} + \frac{1}{2}(w^{(2,0)} - w^{(0,2)})\sqrt{1 + \left(\frac{2w^{(1,1)}}{w^{(2,0)} - w^{(0,2)}}\right)^2} \begin{pmatrix} 1 \\ 0 \\ -1 \end{pmatrix}$$

is an auxiliary matrix, which can be referred to back to the matrix $$\beta = \begin{pmatrix} \beta_{xx} & \beta_{xy} \\ \beta_{xy} & \beta_{yy} \end{pmatrix} = \left(1 - \frac{\tau}{n}\begin{pmatrix} w_o^{(2,0)} & w_o^{(1,1)} \\ w_o^{(1,1)} & w_o^{(0,2)} \end{pmatrix}\right)^{-1}$$

by $$\hat{\beta} = \hat{R}\beta\hat{R}^{-1}$$

where $$\hat{R} = \begin{pmatrix} \cos\varphi & -\sin\varphi \\ \sin\varphi & \cos\varphi \end{pmatrix}$$

is a rotation matrix, which transforms from the special system in which the x axis and the y axis coincide with the directions of the main curvatures of the original wavefront into the general system. Here, $$\varphi = \frac{1}{2}\arctan\frac{2\beta_{xy}}{\beta_{yy} - \beta_{xx}}$$

In equation (54), the matrix $$S(\hat{R}) := \begin{pmatrix} \hat{R} & 0 \\ 0 & 1 \end{pmatrix}$$

is used, and, further, $T^{(1)}$, $T^{(2)}$, $T^{(3)}$, $T^{(4)}$ in equation (54) are matrix-like functions which assign the matrices $$T^{(1)}(X) = \begin{pmatrix} a & c \\ b & d \end{pmatrix}$$

$$T^{(2)}(X) = \begin{pmatrix} a^2 & 2ac & c^2 \\ ab & ad+bc & cd \\ b^2 & 2bd & d^2 \end{pmatrix}$$

$$T^{(3)}(X) = \begin{pmatrix} a^3 & 3a^2c & 3ac^2 & c^3 \\ a^2b & a(ad+2bc) & c(2ad+bc) & c^2d \\ ab^2 & b(2ad+bc) & d(ad+2bc) & cd^2 \\ b^3 & 3b^2d & 3bd^2 & d^3 \end{pmatrix}$$

$$T^{(4)}(X) =$$

$$\begin{pmatrix} a^4 & 4a^3c & 6a^2c^2 & 4ac^3 & c^4 \\ a^3b & a^2(3bc+ad) & 3ac(bc+ad) & c^2(bc+3ad) & c^3d \\ a^2b^2 & 2ab(bc+ad) & b^2c^2+4abcd+a^2d^2 & 2cd(bc+ad) & c^2d^2 \\ ab^3 & b^2(bc+3ad) & 3bd(bc+ad) & d^2(3bc+ad) & cd^3 \\ b^4 & 4b^3d & 6b^2d^2 & 4bd^3 & d^4 \end{pmatrix}$$

to a predetermined matrix $$x = \begin{pmatrix} a & b \\ c & d \end{pmatrix}$$

For even higher orders, the matrices $T^{(n)}$ can be defined with n>4. Finally, as expressions for solutions on which the solutions for the propagated wavefronts can be formed by the transformation in equation (54), there are predetermined for the order n=2

$$\hat{s}_p = \begin{pmatrix} \hat{\tilde{w}}_p^{(2,0)} \\ \hat{\tilde{w}}_p^{(1,1)} \\ \hat{\tilde{w}}_p^{(0,2)} \end{pmatrix} = \begin{pmatrix} \hat{\beta}_{11}^{-1}\hat{w}_o^{(2,0)} \\ 0 \\ \hat{\beta}_{22}^{-1}\hat{w}_o^{(0,2)} \end{pmatrix} = \begin{pmatrix} \hat{w}_o^{(2,0)} \\ 0 \\ \hat{w}_o^{(0,2)} \end{pmatrix} - \frac{\tau}{n}\begin{pmatrix} \hat{w}_o^{(2,0)2} \\ 0 \\ \hat{w}_o^{(0,2)2} \end{pmatrix},$$

for the order n=3

$$\hat{e}_{p3} = \begin{pmatrix} \hat{\tilde{w}}_p^{(3,0)} \\ \hat{\tilde{w}}_p^{(2,1)} \\ \hat{\tilde{w}}_p^{(1,2)} \\ \hat{\tilde{w}}_p^{(0,3)} \end{pmatrix} = \begin{pmatrix} \hat{w}_o^{(3,0)} \\ \hat{w}_o^{(2,1)} \\ \hat{w}_o^{(1,2)} \\ \hat{w}_o^{(0,3)} \end{pmatrix}$$

and for the order n=4

$$\hat{e}_{p4} = \begin{pmatrix} \hat{\tilde{w}}_p^{(4,0)} \\ \hat{\tilde{w}}_p^{(3,1)} \\ \hat{\tilde{w}}_p^{(2,2)} \\ \hat{\tilde{w}}_p^{(1,3)} \\ \hat{\tilde{w}}_p^{(0,4)} \end{pmatrix} = \begin{pmatrix} \hat{w}_o^{(4,0)} \\ \hat{w}_o^{(3,1)} \\ \hat{w}_o^{(2,2)} \\ \hat{w}_o^{(1,3)} \\ \hat{w}_o^{(0,4)} \end{pmatrix} +$$

$$\frac{\tau}{n}\begin{pmatrix} 3\left(\hat{\beta}_{11}\hat{w}_o^{(3,0)2} + \hat{\beta}_{22}\hat{w}_o^{(2,1)2} - \hat{w}_o^{(2,0)4}\right) \\ 3\hat{w}_o^{(2,1)}\left(\hat{\beta}_{11}\hat{w}_o^{(3,0)} + \hat{\beta}_{22}\hat{w}_o^{(1,2)}\right) \\ \hat{w}_o^{(1,2)}\left(\hat{\beta}_{11}\hat{w}_o^{(3,0)} + 2\hat{\beta}_{22}\hat{w}_o^{(1,2)}\right) + \hat{w}_o^{(2,1)}\left(2\hat{\beta}_{11}\hat{w}_o^{(2,1)} + \hat{\beta}_{22}\hat{w}_o^{(0,3)}\right) - \\ \hat{w}_o^{(2,0)2}\hat{w}_o^{(0,2)2} \\ 3\hat{w}_o^{(1,2)}\left(\hat{\beta}_{11}\hat{w}_o^{(2,1)} + \hat{\beta}_{22}\hat{w}_o^{(0,3)}\right) \\ 3\left(\hat{\beta}_{11}\hat{w}_o^{(1,2)2} + \hat{\beta}_{22}\hat{w}_o^{(0,3)2} - \hat{w}_o^{(0,2)4}\right) \end{pmatrix}$$

In the following, it will be shown how the aberrations of a spectacle lens are considered in the optimization thereof in a preferable way by the wavefronts being described in different coordinate systems that are rotated relative to each other. As described with respect to FIG. 1 and FIG. 2, the coordinate systems are preferably defined by the intersection points of the main ray 10 with the refractive surface 14, 16, by the refractive surface, and by the direction of the main ray 10. In order to describe an incoming wavefront, the refractive surface itself, and the outgoing wavefront for the process of refraction on the refractive surface, preferably three different local Cartesian coordinate systems (x,y,z), ($\bar{x}$, $\bar{y}$,$\bar{z}$), and (x',y',z') are used. The origin of all these coordinate systems preferably coincides with the intersection point of the main ray 10 with the refractive surface. While the systems have the normal direction to the plane of refraction (i.e. the plane in which the incoming and the outgoing main ray are located) as the common axis $x=x'=\bar{x}$, the z axis points along the incoming main ray, the z' axis along the outgoing main ray, and the $\bar{z}$ axis along the normal of the refractive surface. The orientations of the axis, axis, and axis are preferably selected such that each system is right-handed (cf. FIG. 5)

At the transition between the coordinate systems, all vector quantities v depend on each other via the following relations $$v = R(\varepsilon)\tilde{v}, v' = R(\varepsilon)\tilde{v}' \quad (55)$$

where R designates the rotations about the common x axis and is defined by the three-dimensional rotation matrix $$R(\varepsilon) = \begin{pmatrix} 1 & 0 & 0 \\ 0 & \cos\varepsilon & -\sin\varepsilon \\ 0 & \sin\varepsilon & \cos\varepsilon \end{pmatrix} \quad (56)$$

In case of a rotation of the coordinate system by the angle α about the z axis, the coordinate transformation is described by $$\begin{aligned} \tilde{x} &= x\cos\alpha - y\sin\alpha \\ \tilde{y} &= x\sin\alpha + y\cos\alpha \end{aligned} \text{ or } \begin{pmatrix} \tilde{x} \\ \tilde{y} \end{pmatrix} = R(\alpha)\begin{pmatrix} x \\ y \end{pmatrix} \quad (57)$$

with the rotation matrix $$R(\alpha) = \begin{pmatrix} \cos\alpha & -\sin\alpha \\ \sin\alpha & \cos\alpha \end{pmatrix} \quad (58)$$

Thus, the wavefront $\tilde{w}$ in the rotated coordinate system $\tilde{x}, \tilde{y}$ is described by $$\tilde{w}(\tilde{x}, \tilde{y}) = w(x(\tilde{x}, \tilde{y}), y(\tilde{x}, \tilde{y})) \quad (59)$$

If one derives the wavefront $\tilde{w}$ according to $\tilde{x}, \tilde{y}$, one obtains the new coefficients $\tilde{a}_{m,k-m}$ relative to the coefficients $a_{m,k-m}$.

$$\tilde{a}_{m,k-m} = \frac{\partial^k}{\partial \tilde{x}^m \partial \tilde{y}^{k-m}} w(x(\tilde{x}, \tilde{y}), y(\tilde{x}, \tilde{y}))\bigg|_{\tilde{x}=0,\tilde{y}=0} \quad (60)$$

In the second order, the aberrations are preferably represented by the vector $$s = \begin{pmatrix} S_{xx} \\ S_{xy} \\ S_{yy} \end{pmatrix} \quad (61)$$

If the coordinate system is rotated by the angle α, the new aberrations $\tilde{s}$ of second order (in the rotated coordinate system ($\tilde{x}, \tilde{y}$)) are calculated via $$\tilde{s} = R_2(\alpha)s \quad (62)$$

with $$R_2(\alpha) = \begin{pmatrix} \cos^2\alpha & -2\cos\alpha\sin\alpha & \sin^2\alpha \\ \cos\alpha\sin\alpha & \cos^2\alpha - \sin^2\alpha & -\cos\alpha\sin\alpha \\ \sin^2\alpha & 2\cos\alpha\sin\alpha & \cos^2\alpha \end{pmatrix} \quad (63)$$

For higher orders of the aberrations, the dependency of the new coefficients $\tilde{a}_{m,k-m}$ on the old coefficients $a_{m,k-m}$ is preferably expressed by $$\begin{pmatrix} \tilde{a}_{00} \\ \tilde{a}_{01} \\ \tilde{a}_{10} \\ \tilde{a}_{02} \\ \tilde{a}_{11} \\ \tilde{a}_{20} \\ \tilde{a}_{03} \\ \tilde{a}_{12} \\ \tilde{a}_{21} \\ \vdots \end{pmatrix} = R_{Pot}(N, \alpha) \begin{pmatrix} a_{00} \\ a_{01} \\ a_{10} \\ a_{02} \\ a_{11} \\ a_{20} \\ a_{03} \\ a_{12} \\ a_{21} \\ \vdots \end{pmatrix} \quad (64)$$

The resulting rotation matrix has the block structure, which shows that the coefficients $a_{m,k-m}$ of the order k only depend on coefficients $a_{m,k-m}$ of the same order k. The rotation matrix for the first 15 coefficients (N=15) up to the order (k=4) thus reads $$R_{Pot}(15, \alpha) = \begin{pmatrix} 1 & 0 & & \cdots & 0 \\ 0 & R_1(\alpha) & & & \vdots \\ & & R_2(\alpha) & & \\ \vdots & & & R_3(\alpha) & 0 \\ 0 & \cdots & & 0 & R_4(\alpha) \end{pmatrix} \quad (65)$$

The matrix elements of the block structures $R_k(\alpha)$ of the first order (k=1) yield the known rotation matrix $$R_1(\alpha) = R(\alpha) = \begin{pmatrix} \cos\alpha & -\sin\alpha \\ \sin\alpha & \cos\alpha \end{pmatrix} \quad (66)$$

In the second order (k=2), the rotation matrix reads $$R_2(\alpha) = \begin{pmatrix} \cos^2\alpha & -2\cos\alpha\sin\alpha & \sin^2\alpha \\ \cos\alpha\sin\alpha & \cos^2\alpha - \sin^2\alpha & -\cos\alpha\sin\alpha \\ \sin^2\alpha & 2\cos\alpha\sin\alpha & \cos^2\alpha \end{pmatrix} \quad (67)$$

in the third order (k=3)

$$R_3(\alpha) = \begin{pmatrix} \cos^3\alpha & -3\cos^2\alpha\sin\alpha & 3\cos\alpha\sin^2\alpha & \sin^3\alpha \\ \cos^2\alpha\sin\alpha & \cos^3\alpha - 2\cos\alpha\sin^2\alpha & \sin^3\alpha - 2\cos^2\alpha\sin\alpha & \cos\alpha\sin^2\alpha \\ \cos\alpha\sin^2\alpha & -(\sin^3\alpha - 2\cos^2\alpha\sin\alpha) & \cos^3\alpha - 2\cos\alpha\sin^2\alpha & \cos^2\alpha\sin\alpha \\ \sin^3\alpha & 3\cos\alpha\sin^2\alpha & 3\cos^2\alpha\sin\alpha & \cos^3\alpha \end{pmatrix} \quad (68)$$

and in the fourth order (k=4)

$$R_4(\alpha) = \begin{pmatrix} \cos^4\alpha & -\cos^3\alpha\sin\alpha & \cos^2\alpha\sin^2\alpha & -\cos\alpha\sin^3\alpha & \sin^4\alpha \\ 4\cos^3\alpha\sin\alpha & \cos^4\alpha - 3\cos^2\sin^2\alpha & 2(\cos\alpha\sin^3\alpha - \cos^3\alpha\sin\alpha) & -(\sin^4\alpha - 3\cos^2\sin^2\alpha) & -4\cos\alpha\sin^3\alpha \\ 6\cos^2\alpha\sin^2\alpha & 2(\cos^3\alpha\sin\alpha - \cos\alpha\sin^3\alpha) & \cos^4\alpha - 4\cos^2\alpha + \sin^4\alpha & 3(\cos\alpha\sin^3\alpha - \cos^3\alpha\sin\alpha) & 6\cos^2\alpha\sin^2\alpha \\ 4\cos\alpha\sin^3\alpha & -(\sin^4\alpha - 3\cos^2\sin^2\alpha) & -2(\cos\alpha\sin^3\alpha - \cos^3\alpha\sin\alpha) & \cos^4\alpha - 3\cos^2\sin^2\alpha & -4\cos^3\alpha\sin\alpha \\ \sin^4\alpha & \cos\alpha\sin^3\alpha & \cos^2\alpha\sin^2\alpha & \cos^3\alpha\sin\alpha & \cos^4\alpha \end{pmatrix} \quad (69)$$

The equations (66) to (69) show that the block matrix elements $e_{i,j}(\alpha)$ of the respective rotation matrix $R_k(\alpha)$ have the symmetry $e_{i,j}(\alpha)=e_{k+2-i,k+2-j}(-\alpha)$. With $c=\cos\alpha$, $s=\sin\alpha$, the block matrices can be simplified to read $$R_1(\alpha) = \begin{pmatrix} c^k s^0 & * \\ c^0 s^k & * \end{pmatrix} \quad (70)$$

$$R_2(\alpha) = \begin{pmatrix} c^k s^0 & * & * \\ kc^1 s^1 & c^2 - s^2 & * \\ c^0 s^k & c^1 s^1 & * \end{pmatrix}$$

$$R_3(\alpha) = \begin{pmatrix} c^k s^0 & * & * & * \\ kc^{k-1}s^1 & c^k - (k-1)c^1 s^{k-1} & * & * \\ kc^1 s^{k-1} & -s^k + (k-1)c^{k-1}s^1 & * & * \\ c^0 s^k & c^1 s^{k-1} & c^{k-1}s^1 & * \end{pmatrix}$$

$$R_4(\alpha) = \begin{pmatrix} c^k s^0 & * & * & * & * \\ kc^{k-1}s^1 & c^k - (k-1)c^2 s^2 & * & * & * \\ 2(k-1)c^2 s^2 & (k-1)(c^{k-1}s^1 - c^1 s^{k-1}) & c^k - 4c^2 s^2 + s^k & * & * \\ kc^1 s^{k-1} & -s^k + (k-1)c^2 s^2 & 2(c^{k-1}s^1 - c^1 s^{k-1}) & * & * \\ c^0 s^k & c^1 s^{k-1} & c^2 s^2 & c^{k-1}s^1 & * \end{pmatrix}$$

$$R_5(\alpha) = \begin{pmatrix} c^k s^0 & * & * & * & * & * \\ kc^{k-1}s^1 & c^k - (k-1)c^{k-2}s^2 & * & * & * & * \\ 2kc^{k-2}s^2 & (k-1)c^{k-1}s^1 - 2(k-2)c^2 s^{k-2} & c^k - 6c^{k-2}s^2 + 3c^1 s^{k-1} & * & * & * \\ 2kc^2 s^{k-2} & -(k-1)c^1 s^{k-1} + 2(k-2)c^{k-2}s^2 & s^k - 6c^2 s^{k-2} + 3c^{k-1}s^1 & * & * & * \\ kc^1 s^{k-1} & -s^k + (k-1)c^2 s^{k-2} & -2c^1 s^{k-1} + 3c^{k-2}s^2 & 2c^{k-1}s^1 - 3c^2 s^{k-2} & * & * \\ c^0 s^k & c^1 s^{k-1} & c^2 s^{k-2} & c^{k-2}s^2 & c^{k-1}s^1 & * \end{pmatrix}$$

In a preferred embodiment, the aberrations are described in the form of Zernike polynomials. In this case, the rotation is performed in the space of the Zernike polynomials. The wavefront is preferably spanned by the Zernike polynomials in polar coordinates:

$$Z_{0,0}(\rho, \varphi) = 1 \qquad (71)$$
$$Z_{1,1}(\rho, \varphi) = 2\rho\cos\varphi$$
$$Z_{1,-1}(\rho, \varphi) = 2\rho\sin\varphi$$
$$Z_{2,0}(\rho, \varphi) = \sqrt{3}(2\rho^2 - 1)$$
$$Z_{2,2}(\rho, \varphi) = \sqrt{6}\rho^2\cos2\varphi$$
$$Z_{2,-2}(\rho, \varphi) = \sqrt{6}\rho^2\cos2\varphi$$
$$\vdots$$

with $$W(x, y) = \sum_{k=0}^{\infty} \sum_{m} c_{k,m} Z_{k,m} \qquad (72)$$

The Zernike coefficients corresponding to a wavefront w(x, y) are preferably determined via the integral $$c_k^m = \frac{1}{\pi r_0^2} \int\int_{pupil} Z_k^m\left(\frac{x}{r_0}, \frac{y}{r_0}\right) w(x,y) dx\, dy \qquad (73)$$

where $r := \sqrt{x^2+y^2}$, $x = \rho\cos\phi$, $y = \rho\sin\phi$, and $r_0$ the pupil size.

In the preferred representation by means of Zernike polynomials in polar coordinates, the rotation for the Zernike coefficients is very simple. The vector of Zernike coefficients is transformed by the rotation $$\begin{pmatrix} \tilde{a}_{00} \\ \tilde{a}_{01} \\ \tilde{a}_{10} \\ \tilde{a}_{02} \\ \tilde{a}_{11} \\ \tilde{a}_{20} \\ \tilde{a}_{03} \\ \tilde{a}_{12} \\ \tilde{a}_{21} \\ \vdots \end{pmatrix} = R_{Pot}(N, \alpha) \begin{pmatrix} a_{00} \\ a_{01} \\ a_{10} \\ a_{02} \\ a_{11} \\ a_{20} \\ a_{03} \\ a_{12} \\ a_{21} \\ \vdots \end{pmatrix} \qquad (74)$$

In a block matrix representation, the rotation matrix is directly based on the elementary rotation matrix of equation (57). For N=15, the rotation matrix has the form:

$$R_{Zernike}(15, \alpha) = \begin{pmatrix} \boxed{1} & \cdots & & & & & \cdots & 0 \\ 0 & \boxed{R(\alpha)} & & & & & & \vdots \\ \vdots & & \boxed{1} & & & & & \\ & & & \boxed{R(2\alpha)} & & & & \\ & & & & \boxed{R(\alpha)} & & & \\ & & & & & \boxed{R(3\alpha)} & & \\ & & & & & & \boxed{1} & \\ & & & & & & \boxed{R(2\alpha)} & \vdots \\ & & & & & & \cdots & 0\ \boxed{R(4\alpha)} \\ & 0 & \cdots & & & & & \end{pmatrix} \qquad (75)$$

For illustration purposes, every block belonging to the same radial order is framed.

If the wavefront is represented via a series as in equations (70) and (71), a series representation, i.e. a linear combination of the coefficients $a_{m,k-m}$ results for the integral of equation (72) as well. If the coefficients $c_k^m$ or $a_{m,k-m}$ are summed as vectors up to a specific order k, a transition matrix T(N) between the Zernike subspace and the Taylor series subspace of the order k can be indicated by $$\begin{pmatrix} c_{0,0} \\ c_{1,1} \\ c_{1,-1} \\ c_{2,0} \\ c_{2,2} \\ c_{2,-2} \\ c_{3,1} \\ c_{3,-1} \\ c_{3,3} \\ \vdots \end{pmatrix} = T(N) \begin{pmatrix} E \\ E_x \\ E_y \\ E_{xx} \\ E_{xy} \\ E_{yy} \\ E_{xxx} \\ E_{xxy} \\ \vdots \\ E_{yy\ldots y} \end{pmatrix} = nT(N) \begin{pmatrix} a_{00} \\ a_{01} \\ a_{10} \\ a_{02} \\ a_{11} \\ a_{20} \\ a_{03} \\ a_{12} \\ a_{21} \\ \vdots \end{pmatrix} \qquad (76)$$

with T(N)=Z(N)D(N), where e.g. for N=9

$$D(9) = \begin{pmatrix} 1 & \cdots & & & & & & \cdots & 0 \\ 0 & r_0 & & & & & & & \vdots \\ \vdots & & r_0 & & & & & & \\ & & & r_0^2 & & & & & \\ & & & & r_0^2 & & & & \\ & & & & & r_0^2 & & & \\ & & & & & & r_0^3 & & \\ \vdots & & & & & & & r_0^3 & \vdots \\ 0 & \cdots & & & & & & 0 & r_0^3 \end{pmatrix} \qquad (77)$$

designates a matrix that indicates the correct power of the pupil radius. The basic transformation matrix Z(N) is determined by Zernike expansion of the power series. Preferably, the following representation is provided for the transformation matrix for N=15:

$$Z^{-1}(15) = \begin{pmatrix} 1 & 0 & 0 & -\sqrt{3} & 0 & 0 & 0 & 0 & 0 & 0 & * & 0 & 0 & 0 & 0 \\ 0 & 2 & 0 & 0 & 0 & 0 & -4\sqrt{2} & 0 & 0 & 0 & 0 & 0 & 0 & \vdots & \vdots \\ \vdots & 0 & 2 & 0 & 0 & 0 & 0 & -4\sqrt{2} & 0 & 0 & 0 & 0 & 0 & & \\ & \vdots & 0 & 4\sqrt{3} & 2\sqrt{6} & 0 & 0 & 0 & 0 & 0 & * & 0 & * & & \\ & & \vdots & 0 & 0 & 2\sqrt{6} & 0 & 0 & 0 & 0 & 0 & * & 0 & & \\ & & & 4\sqrt{3} & -2\sqrt{6} & 0 & 0 & 0 & 0 & 0 & * & 0 & * & & \\ & & & 0 & 0 & 0 & 36\sqrt{2} & 0 & 12\sqrt{2} & 0 & 0 & 0 & 0 & & \\ & \vdots & \vdots & \vdots & 0 & 12\sqrt{2} & 0 & 12\sqrt{2} & 0 & 0 & 0 & & & \\ & & & & 12\sqrt{2} & 0 & -12\sqrt{2} & 0 & 0 & 0 & 0 & \vdots & \vdots & & \\ & & & & 0 & 36\sqrt{2} & 0 & -12\sqrt{2} & 0 & 0 & 0 & 0 & & & \\ & & & & \vdots & 0 & & 0 & * & 0 & * & 0 & * & & \\ & & & & & \vdots & & \vdots & 0 & * & 0 & * & 0 & & \\ & & & & & & & & * & 0 & * & 0 & * & & \\ \vdots & \vdots & \vdots & \vdots & \vdots & \vdots & \vdots & \vdots & & \vdots & 0 & * & 0 & * & 0 \\ 0 & 0 & 0 & 0 & 0 & 0 & 0 & 0 & 0 & & * & 0 & * & 0 & * \end{pmatrix}$$

In this equation as well, the blocks belonging to the same radial order are framed for purposes of illustration. It can be seen that non-disappearing elements also exist outside the diagonal blocks. However, they do not influence the rotation matrix $R_{Pot}(N, \alpha)$.

In order to determine the rotation matrix $R_{Pot}(N, \alpha)$, $R_{Zernike}(N, \alpha)$ is transformed to the coefficient system of the power series development with equation (76):

$$\begin{pmatrix} \tilde{a}_{00} \\ \tilde{a}_{01} \\ \tilde{a}_{10} \\ \tilde{a}_{02} \\ \tilde{a}_{11} \\ \tilde{a}_{20} \\ \tilde{a}_{03} \\ \tilde{a}_{12} \\ \tilde{a}_{21} \\ \vdots \end{pmatrix} = T^{-1}(N) \begin{pmatrix} \tilde{c}_{0,0} \\ \tilde{c}_{1,1} \\ \tilde{c}_{1,-1} \\ \tilde{c}_{2,0} \\ \tilde{c}_{2,2} \\ \tilde{c}_{2,-2} \\ \tilde{c}_{3,1} \\ \tilde{c}_{3,-1} \\ \tilde{c}_{3,3} \\ \vdots \end{pmatrix} =$$

$$T^{-1}(N)R_{Zernike}(N,\alpha) \begin{pmatrix} c_{0,0} \\ c_{1,1} \\ c_{1,-1} \\ c_{2,0} \\ c_{2,2} \\ c_{2,-2} \\ c_{3,1} \\ c_{3,-1} \\ c_{3,3} \\ \vdots \end{pmatrix} = T^{-1}(N)R_{Zernike}(N,\alpha)T(N) \begin{pmatrix} a_{00} \\ a_{01} \\ a_{10} \\ a_{02} \\ a_{11} \\ a_{20} \\ a_{03} \\ a_{12} \\ a_{21} \\ \vdots \end{pmatrix}$$

From this, it follows that $$R_{Pot}(N,\alpha) = T^{-1}(N)R_{Zernike}(N,\alpha)T(N) \tag{78}$$

with a block structure of the form $$R_{Pot}(15) = \begin{pmatrix} 1 & 0 & & \cdots & & 0 \\ 0 & R_1(\alpha) & & & & \vdots \\ & & R_2(\alpha) & & & \\ \vdots & & & R_3(\alpha) & & 0 \\ 0 & \cdots & & & 0 & R_4(\alpha) \end{pmatrix} \tag{79}$$

wherein the block matrices are identical with those of equation (70).

FIG. 6 illustrates an exemplary method for individually optimizing a spectacle lens taking higher-order aberrations (HOA) of both the eye and the spectacle lens into consideration. In a step ST12, not only the local aberrations of $2^{nd}$ order ($S'_{xx}$, $S'_{xy}$, $S'_{yy}$) but also the aberrations of a higher order ($K'_{xxx}$, $K'_{xxy}$, $K'_{xyy}$, etc.) at the vertex sphere are calculated on the basis of wavefront tracing (ST10).

From these, from the local aberrations, the values for sphere, cylinder, and cylinder axis (sph, zyl, A) of the spectacle lens are calculated with the help of Zernike polynomials and/or other suitable metrics, preferably taking the pupil diameter or pupil radius into consideration. Preferably, in a step S14, first of all Zernike coefficients ($c_2^0$, $c_2^2$, $c_2^{-2}$, ...) are determined. Since now also the higher-order local aberrations are known, it is possible to calculate the ideal sph, zyl, A values of the spectacle lens for a finite pupil opening, which preferably correspond to the above-described transformed values. Both the connection between the local aberrations ($S'_{xx}$, $S'_{xy}$, $S'_{yy}$, $K'_{xxx}$, $K'_{xxy}$, $K'_{xyy}$, ...) and the Zernike coefficients ($c_2^0$, $c_2^2$, $c_2^{-2}$, ...), as it is particularly referred to in step ST14, and the connection between the Zernike coefficients ($c_2^0$, $c_2^2$, $c_2^{-2}$, ...) and the values for sphere (Sph), cylinder (Zyl bzw. Cyl), and cylinder axis (A or α) are provided as functional connections $c_2^0$, $c_2^2$, $c_2^{-2}$, ...)=f(r, '$_{xx}$, $S'_{xy}$, $S'_{yy}$, $K'_{xxx}$, $K'_{xxy}$, $K'_{xyy}$, ...) and Sph, Zyl, A=f(r, $c_2^0$, $c_2^2$, $c_2^{-2}$, ...) in a step ST18, particularly taking the pupil radius r into consideration.

Now, it is preferred that the pupil size r be specified to be variable for every visual point. It is particularly preferred that the pupil size be specified as a function of the object distance, which in turn represents a function of the visual point. This can be based e.g. on the near reflex, so that with near objects the assumed pupil diameter decreases.

Preferably, in the refraction determination (ST20), not only the values for sphere, cylinder, and cylinder axis, particularly for distance and near vision, are determined subjectively, but additionally the higher-order aberrations ($c_2^0$, $c_2^2$, $c_2^{-2}$, ...) are determined with an aberrometer. In a step ST22, the subjective and objective refraction data are combined particularly considering object distance, direction of sight, and pupil diameter. Thus, it is possible to calculate ideal (transformed) prescription values (sph, zyl, A) particularly for different pupil diameters depending on the visual point with suitable metrics. It is particularly preferred that the ideal prescriptions be calculated once and then be deposited as a function of the object distance. Moreover, it is preferred that e.g. with the aberrometer also the individual pupil diameter be determined under photopic (small pupil) and mesopic (large pupil) conditions. Otherwise, standard values from literature have to be used. Subsequently, the spherocylindrical values of the spectacle lens (SL) can be combined with those of the eye (ST24) in a known way (combination SL/eye K: K(Ref,Ast)=SL(Sph,Zyl,Axis)−eye (Sph,Zyl,axis). The target function (ST26), in which particularly the target values S(Ref, Ast) provided in a step ST28 are taken into account, preferably remains unchanged. The differences between the combination values K and the target values S determined in step ST24 are particularly taken into account therein: K(Ref,Ast)−S(Ref,Ast).

LIST OF REFERENCE NUMERALS

10 main ray
12 eye
14 first refractive surface (front surface of the spectacle lens)
16 second refractive surface (back surface of the spectacle lens)
18 original wavefront
20 propagated wavefront
22 image point
24 neighboring ray
ST2, ST4 propagation (and optionally rotation)

The invention claimed is:

1. A computer-implemented method for designing a spectacle lens and manufacturing the designed spectacle lens, comprising:
   specifying at least one surface for the spectacle lens to be designed;
   determining the course of a main ray through at least one visual point (i) of the at least one surface;
   determining a spherical and astigmatic aberration outgoing local wavefront set of coefficients ($s_{io}$) and a higher-order aberration outgoing local wavefront set of coefficients ($e_{iok}$) of the local aberration of a local wavefront going out from the at least one visual point (i) in a surrounding of the main ray;
   specifying at least one function $f(e_{ok})$ which assigns a higher-order aberration propagated local wavefront set of coefficients ($e_{pk}$) to a higher-order aberration outgoing local wavefront set of coefficients ($e_{ok}$), wherein $e_{pk}=B_k(e_{ok}+r_k)$, and the proportionality term $B_k$ depends on the spherical and astigmatic aberration outgoing local wavefront set of coefficients ($s_{io}$), but not on the higher-order aberration outgoing local wavefront set of coefficients ($e_{ok}$), and $r_k$ is a remainder term;
   determining a higher-order aberration of a local wavefront propagated starting from the at least one visual point (i) along the main ray depending on at least the higher-order aberration outgoing local wavefront set of coefficients ($e_{iok}$) on the basis of the specified function $f(e_{ok})$;
   designing the at least one surface of the spectacle lens based on the determined higher-order aberration of the propagated local wavefront; and
   manufacturing the designed spectacle lens.

2. The method according to claim 1, wherein determining a spherical and astigmatic aberration outgoing local wavefront set of coefficients comprises determining a power vector $$s_o = \begin{pmatrix} S_{oxx} \\ S_{oxy} \\ S_{oyy} \end{pmatrix},$$

wherein determining a higher-order aberration outgoing local wavefront set of coefficients comprises determining a coma vector $$e_{o3} = \begin{pmatrix} E_{oxxx} \\ E_{oxxy} \\ E_{oxyy} \\ E_{oyyy} \end{pmatrix},$$

and wherein the function $$e_{p3} = \gamma^3 \begin{pmatrix} \beta_y^{-3} & 3\beta_y^{-2}\frac{d}{n}S_{xy} & 3\beta_y^{-1}\left(\frac{d}{n}S_{xy}\right)^2 & \left(\frac{d}{n}S_{xy}\right)^3 \\ \beta_y^{-2}\frac{d}{n}S_{xy} & \beta_y^{-1}\left(\frac{1}{\gamma}+3\left(\frac{d}{n}S_{xy}\right)^2\right) & \frac{2}{\gamma}\frac{d}{n}S_{xy}+3\left(\frac{d}{n}S_{xy}\right)^3 & \beta_x^{-1}\left(\frac{d}{n}S_{xy}\right)^2 \\ \beta_y^{-1}\left(\frac{d}{n}S_{xy}\right)^2 & \frac{2}{\gamma}\frac{d}{n}S_{xy}+3\left(\frac{d}{n}S_{xy}\right)^3 & \beta_x^{-1}\left(\frac{1}{\gamma}+3\left(\frac{d}{n}S_{xy}\right)^2\right) & \beta_x^{-2}\frac{d}{n}S_{xy} \\ \left(\frac{d}{n}S_{xy}\right)^3 & 3\beta_x^{-1}\left(\frac{d}{n}S_{xy}\right)^2 & 3\beta_x^{-2}\frac{d}{n}S_{xy} & \beta_x^{-3} \end{pmatrix} e_{o3}$$

-continued $$\text{with } \gamma = \frac{1}{1 - \frac{d}{n}S_{oxx} - \left(\frac{d}{n}S_{oxy}\right)^2 - \frac{d}{n}S_{oyy} + \left(\frac{d}{n}\right)^2 S_{oxx}S_{oyy}}, \beta_x = \frac{1}{1 - \frac{d}{n}S_{oxx}} \text{ and } \beta_y = \frac{1}{1 - \frac{d}{n}S_{oyy}}$$

is specified as at least one function $f(e_{o3})$.

3. The method according to claim 1, wherein determining a spherical and astigmatic aberration outgoing local wavefront set of coefficients comprises determining a power vector $$s_o = \begin{pmatrix} S_{oxx} \\ S_{oxy} \\ S_{oyy} \end{pmatrix},$$

wherein determining a higher-order aberration outgoing local wavefront set of coefficients comprises determining a coma vector $$e_{o3} = \begin{pmatrix} E_{oxxx} \\ E_{oxxy} \\ E_{oxyy} \\ E_{oyyy} \end{pmatrix}$$

and determining a spherical aberration vector $$e_{o4} = \begin{pmatrix} E_{oxxxx} \\ E_{oxxxy} \\ E_{oxxyy} \\ E_{oxyyy} \\ E_{oyyyy} \end{pmatrix},$$

and wherein the function $$e_{p4} = \begin{pmatrix} \beta_x^4 & \cdots & & \cdots & 0 \\ \vdots & \beta_x^3\beta_y^1 & & & \vdots \\ & & \beta_x^2\beta_y^2 & & \\ \vdots & & & \beta_x^1\beta_y^3 & \vdots \\ 0 & & \cdots & & \beta_y^4 \end{pmatrix}$$

$$\left( e_{o4} + \frac{d}{n} \begin{pmatrix} 3\left(\beta_x E_{oxxx}^2 + \beta_y E_{oxxy}^2 - \frac{S_{oxx}^4}{n^2}\right) \\ 3E_{oxxy}(\beta_x E_{oxxx} + \beta_y E_{oxyy}) \\ \beta_x(2E_{oxxy}^2 + E_{oxxx}E_{oxyy}) + \beta_y(2E_{oxyy}^2 + E_{oxxy}E_{oyyy}) - \left(\frac{S_{oxx}S_{oyy}}{n}\right)^2 \\ 3E_{oxyy}(\beta_x E_{oxxy} + \beta_y E_{oyyy}) \\ 3\left(\beta_x E_{oxyy}^2 + \beta_y E_{oyyy}^2 - \frac{S_{oyy}^4}{n^2}\right) \end{pmatrix} \right)$$

-continued $$\text{with } \beta_x = \frac{1}{1 - \frac{d}{n}S_{oxx}} \text{ and } \beta_y = \frac{1}{1 - \frac{d}{n}S_{oyy}}$$

is specified as at least one function $f(e_{ok})$.

4. The method according to claim 1, further comprising determining an angle α between a first plane of refraction of the main ray at a first surface of the spectacle lens and a second plane of refraction of the main ray at a second surface of the spectacle lens, wherein determining a higher-order aberration comprises:
   determining a higher-order aberration propagated local wavefront set of coefficients ($e_{ipk}$) of the local aberration of the propagated wavefront; and
   determining a transformed higher-order aberration propagated local wavefront set of coefficients ($\tilde{e}_{ipk}$) depending on the determined angle α.

5. The method according to claim 1, which further comprises collecting prescription data V, wherein the prescription data comprises data with respect to spherical power $Sph_V$, magnitude of the astigmatism $Zyl_V$, astigmatism axis $Axis_V$, as well as at least one further higher-order refraction $HOA_V$.

6. The method according to claim 5, wherein collecting prescription data comprises collecting first prescription data for a first object distance and second prescription data for a second object distance.

7. The method according to claim 1, further comprising:
   specifying an object distance model A1(x, y), where A1 designates the object distance and (x, y) a visual point or visual spot of the spectacle lens in a specified or specifiable direction of sight;
   specifying a function $r_0$=g(A1), which describes the dependence of a pupil size $r_0$ on the object distance A1;
   determining a pupil size for the at least one main ray on the basis of the object distance model A1(x, y) and the specified function $r_0$=g(A1).

8. The method according to claim 1, wherein the spectacle lens is a progressive spectacle lens.

9. A computer program product stored on a non-transitory computer readable medium and adapted, when loaded and executed on a computer, to perform a method for designing a spectacle lens according to claim 1.

10. A method for producing a spectacle lens, comprising:
    designing a spectacle lens according to the method for designing a spectacle lens according to claim 1; and
    manufacturing the designed spectacle lens.

11. A device for producing a spectacle lens, comprising:
    a calculator configured to calculate the spectacle lens according to a method for designing a spectacle lens according to claim 1; and
    the device configured to produce the spectacle lens.

12. A device for designing a spectacle lens and manufacturing the designed spectacle lens, comprising:
    a surface model database configured to specify at least one surface for the spectacle lens to be designed;

a main ray determiner configured to determine the course of a main ray through at least one visual point (i) of said at least one surface;

a primary coefficient determiner configured to determine a spherical and astigmatic aberration outgoing local wavefront set of coefficients ($s_{io}$) and a higher-order aberration outgoing local wavefront setoff coefficients ($e_{iok}$) of the local aberration of a local wavefront going out from the at least one visual point (i) in a surrounding of the main ray;

a propagation model database configured to specify at least one function $f(e_{ok})$, which assigns a higher-order aberration propagated local wavefront set of coefficients ($e_{pk}$) to a higher-order aberration outgoing local wavefront set of coefficients ($e_{ok}$), wherein $e_{pk}=B_k(e_{ok}+r_k)$, and the proportionality term $B_k$ depends on the spherical and astigmatic aberration outgoing local wavefront set of coefficients ($s_{io}$), but not on the higher-order aberration outgoing local wavefront set of coefficients ($e_{ok}$), and $r_k$ is a remainder term;

a secondary coefficient determiner configured to determine a higher-order aberration of a local wavefront propagated starting from the at least one visual point (i) along the main ray depending on at least the higher-order aberration outgoing local wavefront set of coefficients ($e_{iok}$) on the basis of the specified function $f(e_{ok})$;

a calculator or optimizer configured to calculate or optimize the at least one surface of the spectacle lens based on the determined higher-order aberration of the propagated local wavefront; and manufacturing the designed spectacle lens.

* * * * *